United States Patent
Schubert et al.

(10) Patent No.: US 11,695,708 B2
(45) Date of Patent: *Jul. 4, 2023

(54) DETERMINISTIC REAL TIME MULTI PROTOCOL HETEROGENEOUS PACKET BASED TRANSPORT

(71) Applicant: Missing Link Electronics, Inc., San Jose, CA (US)

(72) Inventors: Nils Endric Schubert, San Jose, CA (US); David Epping, Ulm (DE); Andreas Braun, Girkenroth (DE); Ulrich Langenbach, Ulm (DE)

(73) Assignee: Missing Link Electronics, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,176

(22) Filed: May 13, 2022

(65) Prior Publication Data

US 2022/0311715 A1 Sep. 29, 2022

Related U.S. Application Data

(63) Continuation of application No. 17/018,962, filed on Sep. 11, 2020, now Pat. No. 11,356,388, which is a
(Continued)

(51) Int. Cl.
*H04L 12/28* (2006.01)
*H04L 49/552* (2022.01)
(Continued)

(52) U.S. Cl.
CPC ............ *H04L 49/552* (2013.01); *H04L 12/56* (2013.01); *H04L 45/44* (2013.01); *H04L 47/24* (2013.01);
(Continued)

(58) Field of Classification Search
CPC ....... H04L 49/552; H04L 49/55; H04L 49/25; H04L 45/44; H04L 47/24; H04L 47/30; H04L 47/34; H04L 47/39
See application file for complete search history.

(56) References Cited

U.S. PATENT DOCUMENTS

| | | | |
|---|---|---|---|
| 5,961,623 | A | 10/1999 | James et al. |
| 6,587,441 | B1 | 7/2003 | Urban et al. |

(Continued)

*Primary Examiner* — Abdelillah Elmejjarmi
(74) *Attorney, Agent, or Firm* — Robert Moll; Doug Weller

(57) ABSTRACT

Deterministic real-time multi-protocol heterogeneous packet-based transport is achieved by traffic shaping. When receiving a plurality of packets from a root complex where contents of each packet from the plurality of packets organized in accordance with a first protocol, a sequence number is added to each packet and a packet type is identified. Every packet in the first plurality of packets is encapsulated into at least one packet organized in accordance with a second protocol to form a second plurality of packets organized in accordance with the second protocol. All the packets from the second plurality of packets pass traffic scheduling or traffic shaping prior being sent via a plurality of connections to avoid burstiness and to achieve bounded transport latency in the plurality of connections, thereby providing deterministic real-time behavior in distributed systems.

18 Claims, 19 Drawing Sheets

Related U.S. Application Data continuation-in-part of application No. 16/892,177, filed on Jun. 3, 2020, now Pat. No. 10,848,442, which is a continuation of application No. 16/055,864, filed on Aug. 6, 2018, now Pat. No. 10,708,199.

(60) Provisional application No. 62/547,399, filed on Aug. 18, 2017.

(51) Int. Cl.
| | |
|---|---|
| *H04L 49/9057* | (2022.01) |
| *H04L 49/25* | (2022.01) |
| *H04L 45/44* | (2022.01) |
| *H04L 47/24* | (2022.01) |
| *H04L 47/34* | (2022.01) |
| *H04L 47/10* | (2022.01) |
| *H04L 47/30* | (2022.01) |
| *H04L 12/54* | (2022.01) |
| *H04L 12/70* | (2013.01) |

(52) U.S. Cl.
CPC ............. *H04L 47/30* (2013.01); *H04L 47/34* (2013.01); *H04L 47/39* (2013.01); *H04L 49/25* (2013.01); *H04L 49/9057* (2013.01); *H04L 2012/5652* (2013.01); *H04L 2212/00* (2013.01)

(56) References Cited

U.S. PATENT DOCUMENTS

| | | | |
|---|---|---|---|
| 7,111,163 B1 | 9/2006 | Haney | |
| 7,443,869 B2 | 10/2008 | Solomon et al. | |
| 7,480,303 B1 | 1/2009 | Ngai | |
| 7,581,044 B1 | 8/2009 | Davis | |
| 7,991,993 B2 | 8/2011 | Josset et al. | |
| 8,284,790 B1 * | 10/2012 | Kommidi | H04L 49/3018 370/416 |
| 8,533,381 B2 | 9/2013 | Uehara et al. | |
| 8,949,499 B2 | 2/2015 | Freking et al. | |
| 9,064,058 B2 | 6/2015 | Daniel | |
| 9,191,109 B2 | 11/2015 | Zbinden et al. | |
| 9,264,384 B1 | 2/2016 | Sundaresan et al. | |
| 9,294,506 B2 | 3/2016 | Swartz | |
| 9,348,396 B2 | 5/2016 | Higuchi et al. | |
| 9,729,408 B2 | 8/2017 | Breslin et al. | |
| 10,686,711 B2 | 6/2020 | Voleti et al. | |
| 2002/0015422 A1 | 2/2002 | Inada et al. | |
| 2002/0146022 A1 | 10/2002 | Van Doren et al. | |
| 2004/0019729 A1 | 1/2004 | Kelley et al. | |
| 2004/0131074 A1 | 7/2004 | Kurth | |
| 2004/0215955 A1 | 10/2004 | Tamai et al. | |
| 2006/0062224 A1 | 3/2006 | Levy et al. | |
| 2006/0072615 A1 | 4/2006 | Narad et al. | |
| 2006/0126612 A1 | 6/2006 | Sandy et al. | |
| 2006/0136715 A1 | 6/2006 | Han et al. | |
| 2006/0206655 A1 | 9/2006 | Chappell et al. | |
| 2007/0121495 A1 | 5/2007 | Breti et al. | |
| 2007/0147378 A1 | 6/2007 | Elgebaly et al. | |
| 2007/0198763 A1 | 8/2007 | Suzuki et al. | |
| 2008/0291994 A1 | 11/2008 | Lida et al. | |
| 2011/0064089 A1 | 3/2011 | Hidaka et al. | |
| 2011/0090880 A1 | 4/2011 | Abraham et al. | |
| 2011/0185163 A1 | 7/2011 | Hidaka | |
| 2011/0317587 A1 | 12/2011 | Lida et al. | |
| 2012/0057546 A1 | 3/2012 | Wang et al. | |
| 2012/0072719 A1 | 3/2012 | Hui et al. | |
| 2012/0078994 A1 | 3/2012 | Jackowski et al. | |
| 2012/0110233 A1 | 5/2012 | Higuchi et al. | |
| 2012/0296952 A1 | 11/2012 | Pope et al. | |
| 2013/0086295 A1 | 4/2013 | Hidaka et al. | |
| 2013/0188511 A1 | 7/2013 | Avni et al. | |
| 2013/0265883 A1 | 10/2013 | Henry et al. | |
| 2014/0115219 A1 * | 4/2014 | Ajanovic | A47K 7/028 710/305 |
| 2014/0237156 A1 | 8/2014 | Regula et al. | |
| 2014/0245053 A1 | 8/2014 | Yoshikawa et al. | |
| 2014/0304450 A1 | 10/2014 | Maeda et al. | |
| 2016/0179738 A1 * | 6/2016 | Guddeti | G06F 13/1642 710/309 |
| 2017/0010931 A1 | 4/2017 | Takahashi et al. | |
| 2017/0163744 A1 | 6/2017 | Lida et al. | |
| 2019/0012290 A1 * | 1/2019 | Watanabe | G06F 13/1668 |
| 2019/0036894 A1 | 1/2019 | Wang et al. | |
| 2020/0106748 A1 | 4/2020 | Newell et al. | |

\* cited by examiner

DETERMINISTIC REAL TIME MULTI PROTOCOL HETEROGENEOUS PACKET BASED TRANSPORT

FIELD OF THE INVENTION

The present invention relates to communication or data or information exchange within an Electronic System and/or between two, or more, Electronic Systems in general and, more particularly, to packet-based transport systems where Packets of a first communication protocol get transported via a second packet-based transport protocol.

BACKGROUND

In telecommunications which is communication or data or information exchange within, over, or among electronic systems typically packet-based transport is used. A Packet is sometimes also called a Message, a Payload Data Unit, or a Protocol Data Unit, or a Packet Data Unit, or a PDU, and is a unit of information that is delivered among peer entities of a communication network. In a layered system according to the Open Systems Interconnection (OSI) model, a Packet is a unit of data which is specified in a protocol of a given layer and which consists of protocol-control information, such as, for example, a network address, and zero, or more, user data.

Various packet-based transport methods are known in the art, for example, GSM, UMTS, LTE, 5G, CAN, CCLink-IE, Modbus-TCP, MOST, Flexray, LIN, AFDX, IIC, HDBase-T, Ethernet, EtherCat, ProfiNET, Sercos, TTCAN, UDP, TCP/IP, IPSec, PATA, SATA, PCIe, SDI, NVMe, MIPI CSI-2, GMSL, FPD-III, BroadR-Reach, WiFi, Bluetooth, and many others.

Sometimes, it becomes necessary to transport a Packet of one given protocol over a network that utilizes a Second Protocol. This is, sometimes, referred to as transporting, tunneling or encapsulation.

The challenges in transporting, tunneling, or encapsulating, Packets of a First Protocol over a Second Protocol are manifold, and non-trivial to solve in practical Electronic System implementations.

Problems include, for example:

Packet Loss: in packet-based transport Packet Loss occurs when a Packet must be considered encumbered or invalid due to signal integrity issues or failing integrity checks, like Cyclic Redundancy Check (CRC), for example. If the First Protocol is loss-less, then every Packet considered invalid by a receiver must be resent by the transmitter of the Packet, while the original ordering of the Packet flow must also be maintained. This can be done by resending the entire, ordered sequence of Packets starting with the invalid Packet. Or, it can be done, for example, by just resending the invalid Packet in which case the receiver must insert the resent Packet back into the ordered sequence position where it replaces the invalid Packet. Those and other approaches known in the art each have their individual benefits and individual drawbacks depending on communication overhead, bandwidth and latency demands, and other technical and cost requirements, and are non-trivial to solve for a given protocol.

Rate Matching: In a loss-less protocol the transmitter must match the rate of Packets sent to the rate at which the receiver can digest the Packets. This concept goes with a technique called flow control. Various approaches for flow control are known in the art: XON/XOFF, reject/resend, or credit-based flow control. Another technique known in the art for rate matching is using buffers, or queues, to temporarily hold one, or more, Packets that cannot be digested by the receiver at the moment, although such techniques will only work for small rate differences and over short moments in time, as otherwise the buffers need to be unpractically large.

Starvation and Deadlocks: Starvation and/or deadlocks can occur in such buffered, or queued, packet-based transport systems, and is, for example, described in U.S. Pat. No. 5,961,623 by James et al., which is hereby included in its entirety by reference or in the book from Addison-Wesley "PCI Express System Architecture" by Ravi Budruk et al. which is hereby included in its entirety by reference, or in the book from Addison-Wesley "PCI System Architecture", Fourth Edition by Tom Shanley et al which is hereby included in its entirety by reference.

Re-packetizing: Re-packetizing is the process of taking Packets of a First Protocol, stripping the headers of the First Protocol, effectively extracting the payload, adding headers of the Second Protocol, and sending the result as Packets of a Second Protocol. Re-packetizing in form of encapsulation is also the process of taking one, or more, Packets of a First Protocol and putting them inside, as payload, of one, or more, Packets of a Second Protocol for transport. Re-packetizing is also called encapsulation when it refers to the process of receiving Packets of a Second Protocol and to extract Packets of a First Protocol from the payload of Packets of a Second Protocol. In most Electronic Systems the Packets of a First Protocol and the Packets of a Second Protocol will be different in size (as measure in multiples of bits and/or Bytes), leading to one of the two situations: i) Either the Packet of the First Protocol is smaller in size than the Packet of the Second Protocol, then every single Packet of the First Protocol can be transported by a single Packet of the Second Protocol. In some practical cases this may be desirable as Packets of a First Protocol can get sent without delay, thereby keeping the added latency of transporting, or encapsulation, low. However, depending on the protocol overhead of Second Protocol this may come at the disadvantage of wasting network bandwidth. In such practical cases it may be advantageous to aggregate two, or more, Packets of a First Protocol, into the payload of one Packet of the Second Protocol, as long as the aggregated Packets fit into the payload of one Packet of the Second Protocol, and transport them together. ii) If the Packets of a First Protocol are larger in size than the Packets of a Second Protocol, then every single Packet of the First Protocol must be split into two, or more, portions each small enough in size to fit the payload of a single Packet of the Second Protocol. This is sometimes referred to as segmentation. Aggregation and segmentation can also be combined to create maximum sized Packets of a Second Protocol.

Real-time behavior: In a distributed system there may be the need to transport Packets within a particular, predetermined latency, allowing receipt within a particular predetermined deadline. This concept is well-known from Field Buses such as CAN, EtherCat, ProfiNET and, recently, has been introduced to Ethernet in form of Time-Sensitive Networking (TSN). Typically, real-time behavior in a networked system comprises the following elements: Transport medium (such as Ethernet, for example), Time Synchronization, Traffic Classification (also known as Priority Handling), Frame Preemption, Traffic Shaping and Scheduled Traffic. Time Synchronization is, for example, described in standards IEEE 1588v2 or IEEE 802.1AS which are hereby included in its entirety by reference. Traffic Classification is, for example, described in standards IEEE 802.1Qav or IEEE 802.1Qch which are hereby included in their entirety by reference. Frame Preemption is, for example, described in standards IEEE 802.3br and IEEE 802.1Qbu which are hereby included in its entirety by reference. Scheduled Traffic is, for example, described in standards IEEE 802.1Qav which is hereby included in its entirety by reference. Recently, this was also standardized for the use of so-called Industrial Ethernet, for example in IEEE 802.1Q or amendment IEEE 802.1Qbv which are hereby included in their entirety by reference.

With recent advancements in semiconductor technology and Electronic System processing it now becomes feasible to transport Packets of a First Protocol over a Second Protocol, cost and energy efficiently. Various approaches are known in the art: In IEEE Standard 1722-2016, which is hereby included in its entirety by reference, an Audio-Video-Broadcast Transport Protocol is defined which can, for example, transport other protocols, such as CAN or IEEE 1394 Firewire.

In U.S. Pat. No. 5,961,623 by James et al., which is hereby included in its entirety by reference or in U.S. Pat. No. 7,581,044 by Davis, which is hereby included in its entirety by reference or in U.S. Pat. No. 7,443,869 by Solomon et al., which is hereby included in its entirety by reference or in United States Patent Application Number 2007/0121495 by Breti et al., which is hereby included in its entirety by reference or in United States Patent Application Number 2014/0237156 by Regula et al., which is hereby included in its entirety by reference or in United States Patent Application Number 2004/0019729 by Kelley et al., which is hereby included in its entirety by reference or in United States Patent Application Number 2002/0146022 by Van Doren et al., which is hereby included in its entirety by reference techniques are presented to avoid deadlocks and/or starvation for packet-based transport using one single protocol, namely PCI Express. However, none of those publications addresses any aspects when Packets of a First Protocol get transported over a Second Protocol.

In United States Patent Application Number 2011/0064089 by Hidaka et al., which is hereby included in its entirety by reference or in United States Patent Application Number 2011/0185163 by Hidaka et al., which is hereby included in its entirety by reference or in United States Patent Application Number 2013/0086295 by Hidaka et al., which is hereby included in its entirety by reference or in U.S. Pat. No. 9,348,396 by Higuchi et al., which is hereby included in its entirety by reference or in U.S. Pat. No. 8,533,381 by Uehara et al., which is hereby included in its entirety by reference or in U.S. Pat. No. 8,949,499 by Freking et al., which is hereby included in its entirety by reference or in United States Patent Application Number 2006/0126612 by Sandy et al., which is hereby included in its entirety by reference or in United States Patent Application Number 2012/0110233 by Higuchi et al., which is hereby included in its entirety by reference or in United States Patent Application Number 2007/0198763 by Suzuki et al., which is hereby included in its entirety by reference or in United States Patent Application Number 2017/0109310 by Takahashi et al., which is hereby included in its entirety by reference or in United States Patent Application Number 2014/0245053 by Yoshikawa et al., which is hereby included in its entirety by reference or in U.S. Pat. No. 9,264,384 by Sundaresan et al., which is hereby included in its entirety by reference or in U.S. Pat. No. 7,480,303 by Ngai, which is hereby included in its entirety by reference or in U.S. Pat. No. 9,191,109 by Zbinden et al., which is hereby included in its entirety by reference or in United States Patent Application Number 2008/0291994 by Lida et al., which is hereby included in its entirety by reference or in United States Patent Application Number 2017/0163744 by Lida et al., which is hereby included in its entirety by reference or in United States Patent Application Number 2011/0317587 by Lida et al., which is hereby included in its entirety by reference or in U.S. Pat. No. 9,064,058 by Daniel, which is hereby included in its entirety by reference techniques are presented for transporting Packets of a First Protocol for example by encapsulating them into Packets of a Second Protocol.

This includes techniques for addressing, or for routing. However, none of those publications addresses any aspects of avoiding deadlocks and/or starvation.

At the same time, combining techniques for packet-based transport of Packets of a First Protocol via a Second Protocol with techniques for avoiding deadlocks and/or starvations is not trivial as the deadlock and starvation avoiding techniques of First Protocol are in most cases neither applicable nor practicable to the Second Protocol. For example, techniques for avoiding deadlocks and/or starvation applicable to the PCI Express protocol cannot be applied to the TCP/IP protocol, as we will demonstrate later. This creates the need for solutions that effectively can avoid deadlocks and/or starvation when Packets of a First Protocol get transported over a Second Protocol and, at the same time, are efficient with regards to bandwidth and/or latency in terms of re-packetizing.

PCB is a Printed Circuit Board.

ECU is an Electronic Control Unit and is a generic term for any embedded system that controls one or more of the electrical systems or subsystems in a motor vehicle.

PLC is a Programmable Logic Controller and is a digital computer used for automation of electromechanical processes, such as control of machinery on factory assembly lines, amusement rides, or light fixtures.

A Programmable Circuit is an integrated digital and/or analog circuit device which can be user-programmed without a manufacturing step, typically by uploading a configuration bit file into the device after power-up.

FPGA is a Field-Programmable Gate-Array, a special digital Programmable Circuit device.

FPAA is a Field-Programmable Analog-Array, a special analog Programmable Circuit device.

PLD is a Programmable Logic Device, another special Programmable Circuit device.

CPLD is a Complex Programmable Logic Device, another special Programmable Circuit device.

FSM is a Finite State Machine which can be implemented in a digital circuit.

CPU is a Central Processing Unit, typically a Von-Neumann data processing machine.

DSP is a Digital Signal Processor, a CPU highly optimized towards processing digital signal values.

ASIC is an Application Specific Integrated Circuit which is a digital, or mixed-signal, or analog integrated circuit optimized and built for a specific application.

ASSP is an Application-Specific Standard Processor which is an integrated digital circuit device which comprises one, or more, CPUs, plus application-specific circuitry.

Microcontroller is a digital and/or mixed-signal integrated circuit device which comprises one, or more, CPUs plus special-purpose peripherals and inputs/outputs.

SOC is a System-on-a-Chip which is a digital and/or mixed-signal integrated circuit device which comprises one, or more, CPUs, special-purpose peripherals, inputs/outputs, application-specific circuitry, memory, etc.

PSOC is a Programmable System-on-a-Chip, a SOC which is implemented using Programmable Circuits.

HDL is Hardware Description Language which is a human and machine readable language typically used to describe the behavior, structure, concurrency, and/or timing of integrated digital, or analog, circuitry. Examples of HDL are VHDL, Verilog, SystemVerilog, SystemC, or C, or C++.

VHDL is VHSIC hardware description language which is the HDL specified and standardized, for example, by IEEE 1076-2008, which is hereby included in its entirety by reference.

Verilog is the HDL specified and standardized for example, by IEEE 1364-2005, which is hereby included in its entirety by reference.

SystemVerilog is the HDL specified and standardized, for example, by IEEE 1800-2009, which is hereby included in its entirety by reference.

SystemC is the HDL specified and standardized, for example, by IEEE 1666-2005, which is hereby included in its entirety by reference.

PLB is Processor Local Bus which is defined by IBM's CoreConnect on-chip architecture.

AXI is the Advanced eXtensible Interface which is part of the Advanced Microcontroller Bus Architecture (AMBA) defined by ARM Ltd.

RAM is Random Access Memory which typically is volatile digital storage, such as DDR2 RAM or DDR3 RAM or LPDDR RAM.

OS is Operating System which is Software code for resource, task, and user management of a data processing system.

Router is a device or an application that forwards data packets between computer networks, creating an overlay internetwork.

A Bridge applies a forwarding technique used in packet-switched computer networks and typically makes no assumptions about where in a network a particular address is located.

A Tunnel is using a networking protocol where one network protocol (the delivery protocol) encapsulates a different payload protocol, for example to carry a payload over an incompatible delivery-network, or to provide a secure path through an untrusted network.

GSM stands for Global System for Mobile Communications and is a standard set developed by the European Telecommunications Standards Institute to describe technologies for second generation digital cellular networks.

UMTS stands for Universal Mobile Telecommunications System and is a third generation mobile cellular technology for networks based on the GSM standard.

LTE stands for Long-Term Evolution and is a fourth generation mobile cellular technology for networks based on the GSM standard.

CAN is Controller Area Network which is a vehicle bus standard ISO 11898 designed to allow microcontrollers and devices to communicate with each other within a vehicle without a host computer.

MOST is Media Oriented Systems Transport which is a high-speed multimedia network technology optimized by the automotive industry.

Flexray is an automotive network communications protocol developed by the FlexRay Consortium, and which is currently being converted into an ISO standard.

LIN is Local Interconnect Network which is a vehicle bus standard or computer networking bus-system used within current automotive network architectures.

AFDX is Avionics Full-Duplex Switched Ethernet which is a data network for safety-critical applications that utilizes dedicated bandwidth while providing deterministic Quality of Service. AFDX is based on IEEE 802.3 Ethernet technology and is described specifically by the ARINC 664 specification. Safety can be Functional Safety, as it is, for example, defined in ISO Standards 61508 or EN 262626, which are hereby included by reference in their entirety.

SPI is Serial Peripheral Interface Bus which is a synchronous serial data link standard, named by Motorola, that operates in full duplex mode.

IIC is Inter-Integrated Circuit which is a multi-master serial single-ended computer bus invented by Philips that typically is used to attach low-speed peripherals.

GPIO is General Purpose Input/Output is generic pins on an integrated circuit whose behavior (including whether it is an input or output pin) can be controlled through software.

Ethernet is a family of computer networking technologies for local area networks and is standardized in IEEE 802.3 and in IEEE 802.1.

EtherCat is Ethernet for Control Automation Technology which is an open high performance Ethernet-based fieldbus system.

ProfiNET is the open industrial Ethernet standard of PROFIBUS & PROFINET International for automation.

Sercos is Serial Real-Time Communication System Interface which is a globally standardized open digital interface for the communication between industrial controls, motion devices (drives) and input output devices (I/O) and is classified as standard IEC 61491 and EN 61491.

BroadR-Reach is an Ethernet physical layer standard designed for use in automotive connectivity applications. Originally invented by Broadcom Ltd. it has evolved into an open standard by the IEEE as 100Base-T1 in 802.3bw-2015 Clause 96, or as 1000Base-T1, for example.

TTCAN is Time-Triggered communication on CAN which is defined by the ISO 11898-4 standard.

CANOpen is a communication protocol and device profile specification for embedded systems used in automation. The basic CANopen device and communication profiles are given in the CiA 301 specification released by CAN in Automation.

SDI is the Serial Digital Interface, in form of SDI, HD-SDI, 3G-SDI, 6G-SDI, specified by the Society of Motion Picture and Television Engineers (SMPTE) for as SMTPE 292M or SMPTE 372M or SMPTE 424M or SMPTE ST 2081 or SMPTE ST 2082, which are hereby included by reference in their entirety.

MIPI CSI-2 is the Camera Serial Interface specification of the Mobile Industry Processor Interface (MIPI) Alliance and defines an interface between a camera and a CPU. It has been, for example, specified in 2019 in CSI-2 v3.0 Specification, which is hereby included by reference.

GMSL or Gigabit Multimedia Serial Link is a serialized high-speed interface from Maxim Integrated.

FPD-III or Flat Panel Display Link is a high-speed digital video interface created by National Semiconductor in 1996 and is now a free and open standard.

HDBase-T or HDBaseT or HDBT is a commercial connectivity standard and transmission protocol, defined by the HDBaseT Alliance.

UDP is User Datagram Protocol which is one of the core members of the Internet Protocol Suite, the set of network protocols used for the Internet.

TCP/IP is Transmission Control Protocol/Internet Protocol is a descriptive framework for the Internet Protocol Suite of computer network protocols created in the 1970s by DARPA. TCP/IP has four abstraction layers and is defined in RFC 1122.

TSN is Time-Sensitive Networking which enables real-time functionality for Ethernet and which is defined by a set of Standards such as IEEE 1588, IEEE 802.1AS, IEEE 802.1Q-2018, and others.

DCTCP is Data Center Transmission Control Protocol is a modification to conventional TCP described, for example, in "Data Center TCP (DCTCP)" by M. Alizadeh et al., in Proceedings of SIGCOMM 2010 which is hereby included by reference.

DetNet is Deterministic Networking described by the IETF DetNet Working Group as an implementation of deterministic data paths for real-time applications using Internet Protocol (IP) over TSN. It is, for example, described in IETF RFC 8655 which is hereby included by reference.

QUIC is a general purpose transport layer protocol initially designed by Google and, for example, specified by the IETF in "QUIC: A UDP-Based Multiplexed and Secure Transport" which is hereby included by reference.

IPSec is Internet Protocol Security which is a protocol suite for securing Internet Protocol (IP) communications by authenticating and encrypting each IP packet of a communication session. IPsec also includes protocols for establishing mutual authentication between agents at the beginning of the session and negotiation of cryptographic keys to be used during the session.

RS232 is Recommended Standard 232 which is the traditional name for a series of standards for serial binary single-ended data and control signals connecting between a DTE (Data Terminal Equipment) and a DCE (Data Circuit-terminating Equipment).

RS485 also known as EIA-485, also known as TIA/EIA-485 is a standard defining the electrical characteristics of drivers and receivers for use in balanced digital multi-point systems. This standard is published by the ANSI Telecommunications Industry Association/Electronic Industries Alliance (TIA/EIA).

USB is Universal Serial Bus which is an industry standard developed in the mid-1990s that defines the cables, connectors and communications protocols used in a bus for connection, communication and power supply between computers and electronic devices.

PATA is Parallel ATA which is an interface standard for the connection of storage devices such as hard disks, solid-state drives, floppy drives, and optical disc drives in computers.

SATA is Serial Advanced Technology Attachment which is a computer bus interface for connecting host bus adapters to mass storage devices such as hard disk drives and optical drives.

PCIe also known as PCI Express (Peripheral Component Interconnect Express) is a computer expansion bus standard maintained and developed by the PCI Special Interest Group.

NVMe also known as NVM Express (Non-Volatile Memory Express) is a protocol typically used for Solid-State Drives. It can be transported via PCIe or via so-called Fabrics such as Infiniband or Ethernet. It is standardized, for example by the NVM Express Workgroup in "NVM Express Base Specification Revision 1.4," which is hereby included by reference in its entirety, and standardized in "NVM Express over Fabrics Revision 1.1," which is hereby included by reference in its entirety.

WiFi is a mechanism that allows electronic devices to exchange data wirelessly over a computer network using the IEEE 802.11 family of standards.

Bluetooth is a proprietary open wireless technology standard for exchanging data over short distances, creating personal area networks with high levels of security, a standard which is maintained by the Bluetooth Special Interest Group. 5G, or 5G NR, is the fifth generation technology standard for cellular networks by the International Telecommunication Union.

DESCRIPTION OF THE EMBODIMENT

Heterogeneous packet-based transport systems enable implementing Electronic Systems as so-called distributed systems. Multiple subsystems which utilize a First Protocol for localized communication internally can then be connected with each other using a different Second Protocol, which allows communication over distances, more cost and energy-efficiently. Examples of protocols which have advantages for localized, or short-range, communication are: MOST, FlexRay, LIN, CAN, IIC, PATA, SATA, PCI Express, NVMe, SDI, MIPI CSI-2, GMSL, FPD-III, Bluetooth. Examples of protocols which are advantageous for more long-range distributed communications are: GSM, UMTS, LTE, AFDX, HD-BaseT, Ethernet, EtherCat, ProfiNET, Sercos, UDP, TCP/IP, TSN, DCTCP, DetNet, QUIC, 5G, WiFi.

As outlined above, for proper functioning deadlocks and/or starvation must be avoided while, at the same time, requirements for bandwidth and latency must be met.

Figure 1:
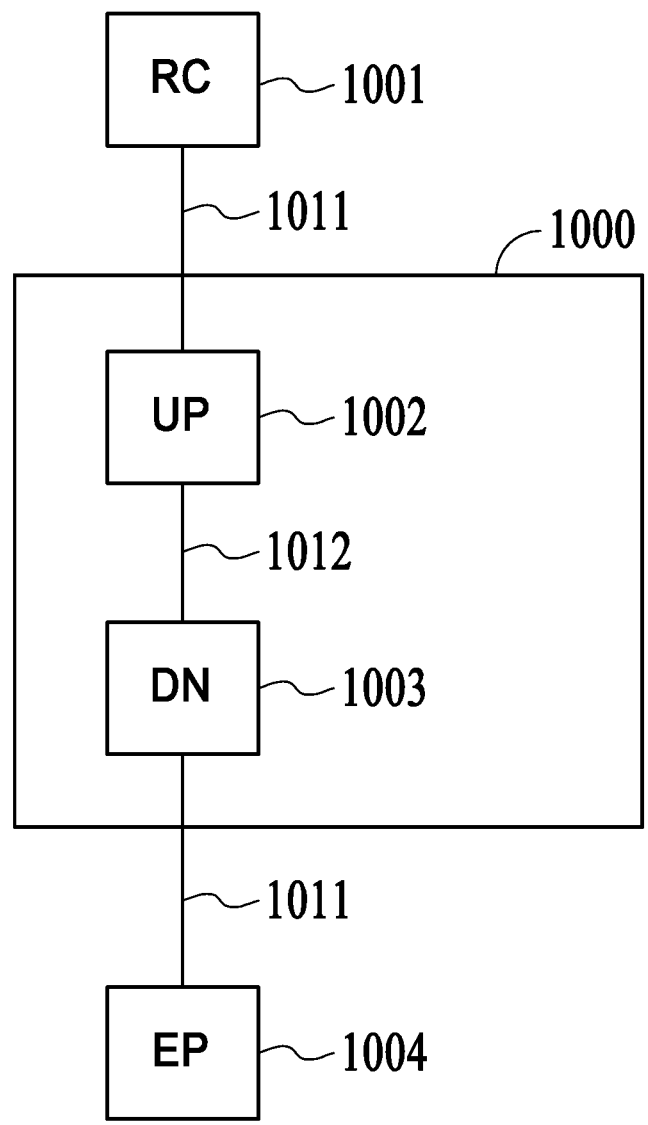
FIG. 1 illustrates a heterogeneous packet-based transport system with a single root complex (RC) and a single endpoint (EP).

One embodiment of this invention is the system of FIG. 1 where root complex (RC) 1001 and endpoint (EP) 1004 are connected via a First Protocol 1011 in a distributed fashion, namely via distributed switch 1000. Switch 1000 can be considered a distributed switch because upstream port (UP) 1002 and downstream port (DN) 1003 are communicating via a Second Protocol 1012. While protocol 1011 may be optimized in terms of cost, energy, bandwidth, latency, or else for shorter distances, i.e. within a short range, protocol 1012 may be optimized in terms of cost, energy, bandwidth, latency, or else for longer distances. Therefore, Switch 1000 enables to implement a distributed system where two components, RC 1001 and EP 1004 communicate over the protocol 1011 while they may be further apart in distance than protocol 1011 typically permits. Other reasons for using a different protocol 1012 can be that protocol 1012 may be using a cabling or transport media with different environmental properties, such as hotter, or colder, ambient temperature for example, than the cabling or transport media of the First Protocol 1011 supports.

UP 1002 receives Packets of the First Protocol 1011 from RC 1001, re-packetizes those into Packets of the Second Protocol 1012, and transmits the Packets of the Second Protocol 1012 to DN 1003. UP 1002 further receives Packets of the Second Protocol 1012 from DN 1003, re-packetizes those into Packets of the First Protocol 1011, and transmits the Packets of the First Protocol 1011 to RC 1001. Similarly, DN 1003 receives Packets of the First Protocol 1011 from EP 1004, re-packetizes those into Packets of the Second Protocol 1012, and transmits the Packets of the Second Protocol 1012 to UP 1002. DN 1003 further receives Packets of the Second Protocol 1012 from UP 1002, re-packetizes those into Packets of the First Protocol 1011, and transmits the Packets of the First Protocol 1011 to EP 1004.

Within the distributed switch 1000, UP 1002 and DN 1003 are working in concert to avoid any deadlocks and/or starvation while, at the same time, re-packetization is performed.

If Bluetooth or USB or PATA or SATA or CAN or LIN, for example, are used for protocol 1011, then RC 1001 can be referred to as Host or Master, and EP 1004 can be referred to as Device. If PCI Express is used as protocol 1011, then RC 1001 can be referred to as the PCI Express Root Complex, or the PCI Express RC, and EP 1004 can be referred to as the PCI Express Endpoint or the PCI Express EP or can be another PCI Express Upstream Port (as PCI Express allows a tree-like topology), and UP 1002 can be referred to as the UP, and DN 1003 can be referred to as the PCI Express Downstream Port or DN, and switch 1000 can be referred to as a so-called Transparent PCI Express Switch.

Figure 2:
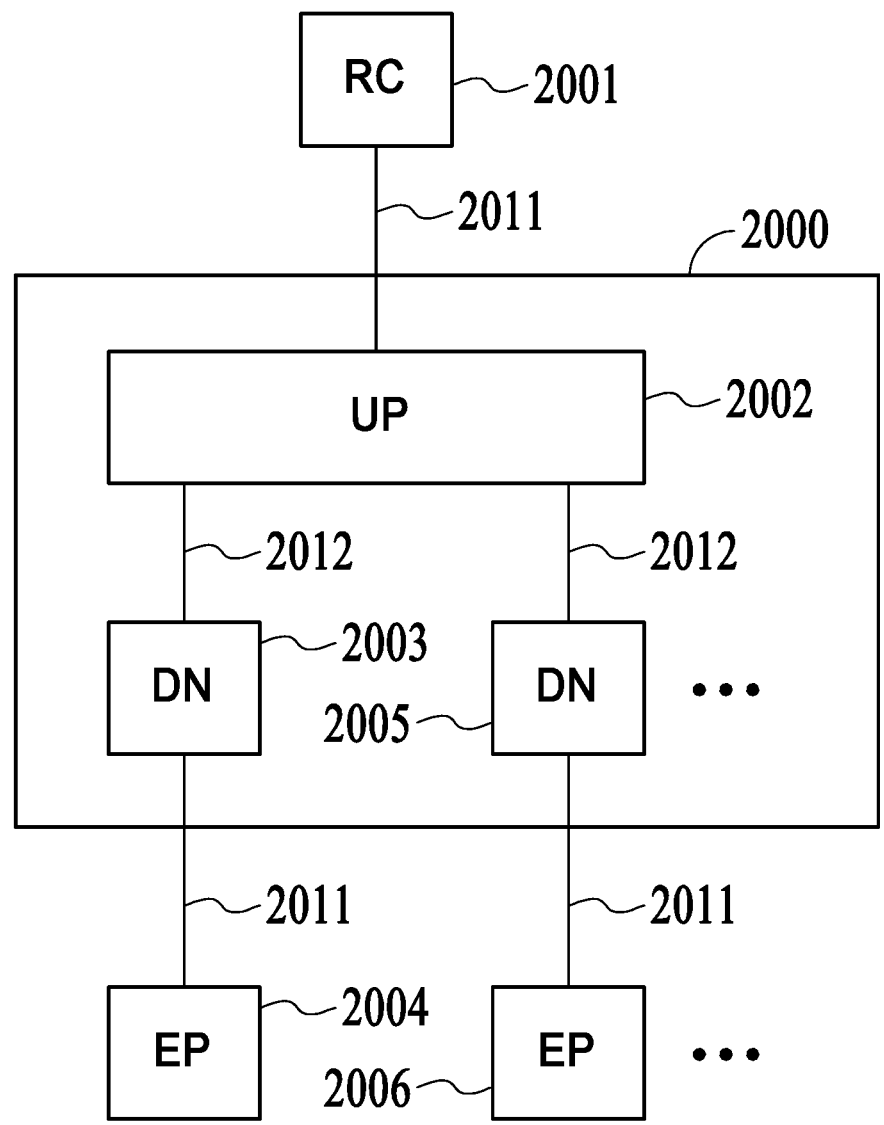
FIG. 2 illustrates a heterogeneous packet-based transport system with a single RC and multiple EPs.

One other embodiment of this invention is the system of FIG. 2 where RC 2001 and two, or more, EP, namely EP 2004 and EP 2006, are connected via the First Protocol 2011, in a distributed fashion, namely via distributed switch 2000. The distributed switch 2000 comprises one UP 2002, which connects with RC 2001 via the protocol 2011. The distributed switch 2000 further comprises two, or more, DN, namely DN 2003, which is connected to EP 2004 via protocol 2011, and DN 2005, which is connected to EP 2006 via protocol 2011, and so on. The one UP 2002 is then connected via Second Protocol 2012 to the two, or more, DN, namely DN 2003 and DN 2005.

In such a system, UP 2002 receives Packets of the First Protocol 2011 from RC 2001, re-packetizes those into Packets of the Second Protocol 2012, and transmits the Packets of the Second Protocol 2012 to DN 2003, DN 2005, and so on. UP 2002 further receives Packets of the Second Protocol 2012 from DN 2003 or DN 2005, resp., re-packetizes those into Packets of the First Protocol 2011, and transmits the Packets of the First Protocol 2011 to RC 2001. Similarly, DN 2003 receives Packets of the First Protocol 2011 from EP 2004, re-packetizes those into Packets of the Second Protocol 2012, and transmits the Packets of the Second Protocol 2012 to UP 2002. DN 2003 further receives Packets of the Second Protocol 2012 from UP 2002, re-packetizes those into Packets of the First Protocol 2011, and transmits the Packets of the First Protocol 2011 to EP 2004. And, similarly, DN 2005 receives Packets of the First Protocol 2011 from EP 2006, re-packetizes those into Packets of the Second Protocol 2012, and transmits the Packets of the Second Protocol 2012 to UP 2002. DN 2005 further receives Packets of the Second Protocol 2012 from UP 2002, re-packetizes those into Packets of the First Protocol 2011, and transmits the Packets of the First Protocol 2011 to EP 2006.

Within the distributed switch 2000, UP 2002 and the two, or more, DN (DN 2003, DN 2005, etc.) are working in concert to avoid any deadlocks and/or starvation while, at the same time, re-packetiziation is performed.

If Bluetooth or USB or PATA or SATA or CAN or LIN, for example, are used for protocol 2011, then RC 2001 can be referred to as Host or Master, and the two, or more, EP (EP 2004, EP 2006, etc.) can be referred to as Device. If PCI Express is used as protocol 2011, then RC 2001 can be referred to as the PCI Express RC, and the two, or more, EP (EP 2004, EP 2006, etc.) each can be referred to as the PCI Express EP or can be another UP (as PCI Express allows a tree-like topology), and UP 2002 can be referred to as the UP, and the two, or more, DN (DN 2003, DN 2005, etc.) each can be referred to as the DN, and switch 2000 can be referred to as a so-called Transparent PCI Express Switch. Yet another embodiment of this invention is the system of FIG. 3 where RC 3001 and two, or more, EP, namely EP 3004 and EP 3006, are connected via the First Protocol 3011, in a distributed fashion, namely via distributed switch 3000. The distributed switch 3000 comprises one UP 3002, which connects with RC 3001 via the protocol 3011. The distributed switch 3000 further comprises two, or more, DN, namely DN 3003, which is connected to EP 3004 via protocol 3011, and DN 3005, which is connected to EP 3006 via protocol 3011, and so on. The one UP 3002 is then connected via Second Protocol 3012 to switch SW 3007 and SW 3007 is connected via Second Protocol 3012 to the two, or more, DN, namely DN 3003 and DN 3005.

In such a system, UP 3002 receives Packets of the First Protocol 3011 from RC 3001, re-packetizes those into Packets of the Second Protocol 3012, and transmits the Packets of the Second Protocol 3012 to SW 3007. UP 3002 further receives Packets of the Second Protocol 3012 from SW 3007 re-packetizes those into Packets of the First Protocol 3011, and transmits the Packets of the First Protocol 3011 to RC 3001. Similarly, DN 3003 receives Packets of the First Protocol 3011 from EP 3004, re-packetizes those into Packets of the Second Protocol 3012, and transmits the Packets of the Second Protocol 3012 to SW 3007. DN 3003 further receives Packets of the Second Protocol 3012 from SW 3007, re-packetizes those into Packets of the First Protocol 3011, and transmits the Packets of the First Protocol 3011 to EP 3004. And, similarly, DN 3005 receives Packets of the First Protocol 3011 from EP 3006, re-packetizes those into Packets of the Second Protocol 3012, and transmits the Packets of the Second Protocol 3012 to SW 3007. DN 3005 further receives Packets of the Second Protocol 3012 from SW 3007, re-packetizes those into Packets of the First Protocol 3011, and transmits the Packets of the First Protocol 3011 to EP 3006. Within the distributed switch 3000, UP 3002 and the two, or more, DN (DN 3003, DN 3005, etc.) are working in concert to avoid any deadlocks and/or starvation while, at the same time, re-packetization is performed.

If Bluetooth or USB or PATA or SATA or CAN or LIN, for example, are used for protocol 3011, then RC 3001 can be referred to as Host or Master, and the two, or more, EP (EP 3004, EP 3006, etc.) each can be referred to as Device. If PCI Express is used as protocol 3011, then RC 3001 can be referred to as the PCI Express RC, and the two, or more, EP (EP 3004, EP 3006, etc.) each can be referred to as the PCI Express EP or can be another UP (as PCI Express allows a tree-like topology), and UP 3002 can be referred to as the UP, and the two, or more, DN (DN 3003, DN 3005, etc.) each can be referred to as the DN, and switch 3000 can be referred to as a so-called Transparent PCI Express Switch. If GSM or UMTS or LTE or AFDX or Ethernet or EtherCat or ProfiNET or HDBase-T or Sercos or UDP or TCP/IP or WiFi is used for Second Protocol 3012, then SW 3007 can be either a transparent networking switch for the Second Protocol 3012, being totally unaware of the fact that the First Protocol 3011 is tunneled via the Second Protocol 3012. Or, SW 3007 can be a smart switch which is aware of the fact that the First Protocol 3011 is tunneled via the Second Protocol 3012. In this case, SW 3007 has mechanisms as described below to avoid any deadlocks and/or starvation within the distributed switch 3000.

Figure 4:
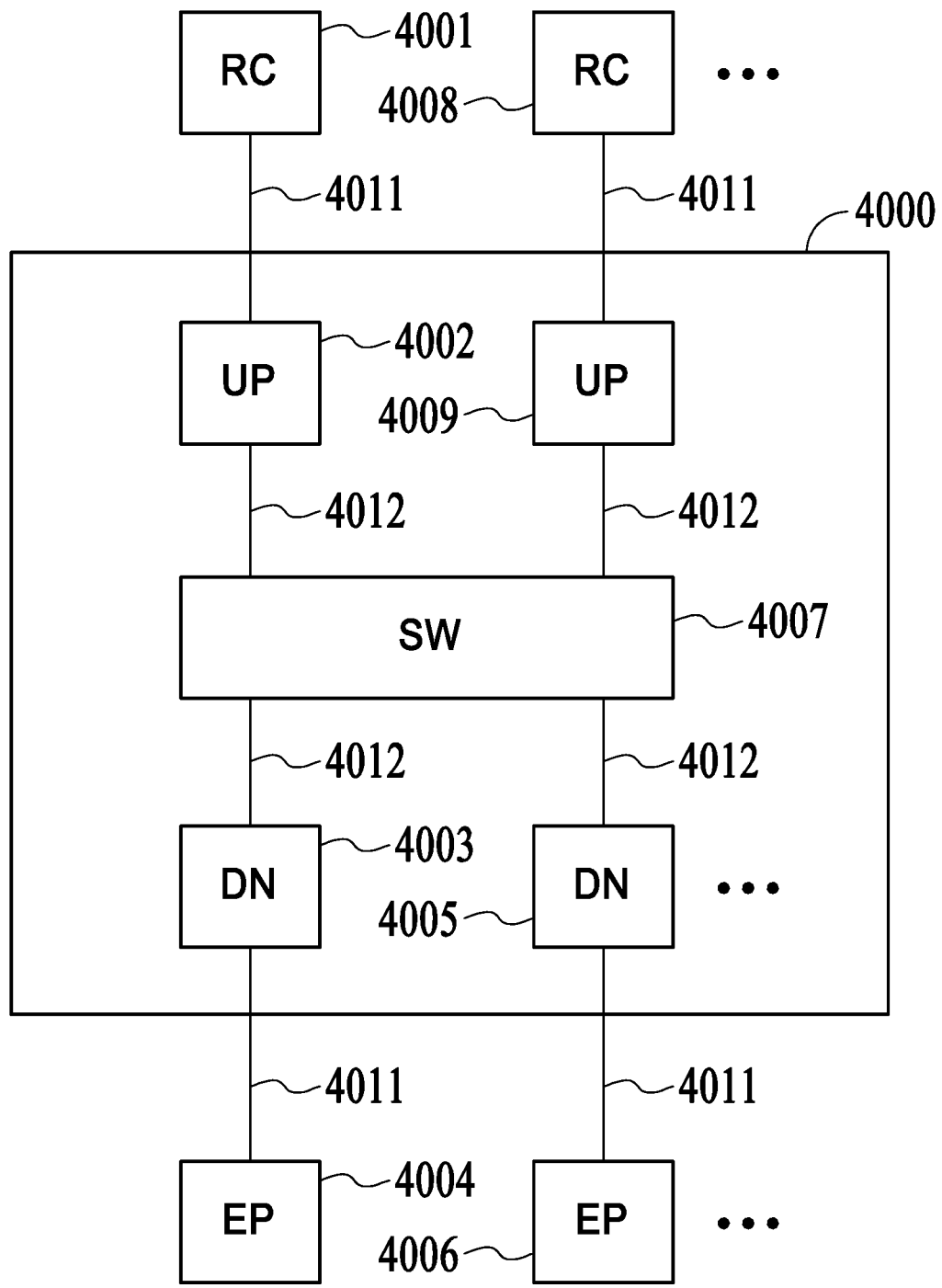
FIG. 4 illustrates a heterogeneous packet-based transport system with multiple RCs, a switch and multiple EPs.

And yet another embodiment of this invention is the system of FIG. 4 where two, or more, RC, namely RC 4001, RC 4008, etc., and two, or more, EP, namely EP 4004 and EP 4006, are connected via the First Protocol 4011, in a distributed fashion, namely via distributed switch 4000. The distributed switch 4000 comprises two, or more, UP, namely UP 4002, UP 4009, etc., which each connect with RC 4001, or RC 4008, resp., via the protocol 4011. The distributed switch 4000 further comprises two, or more, DN, namely DN 4003, which is connected to EP 4004 via protocol 4011, and DN 4005, which is connected to EP 4006 also via protocol 4011, and so on. The two, or more, UP (UP 4002, UP 4009, etc.) are then connected via Second Protocol 4012 to SW 4007 and SW 4007 is connected via Second Protocol 4012 to the two, or more, DN, namely DN 4003 and DN 4005.

In such a system, UP 4002 receives Packets of the First Protocol 4011 from RC 4001, re-packetizes those into Packets of the Second Protocol 4012, and transmits the Packets of the Second Protocol 4012 to SW 4007. UP 4002 further receives Packets of the Second Protocol 4012 from SW 4007 re-packetizes those into Packets of the First Protocol 4011, and transmits the Packets of the First Protocol 4011 to RC 4001. Similarly, UP 4009 receives Packets of the First Protocol 4011 from RC 4008, re-packetizes those into Packets of the Second Protocol 4012, and transmits the Packets of the Second Protocol 4012 to SW 4007. UP 4009 further receives Packets of the Second Protocol 4012 from SW 4007 re-packetizes those into Packets of the First Protocol 4011, and transmits the Packets of the First Protocol 4011 to RC 4008. Similarly, DN 4003 receives Packets of the First Protocol 4011 from EP 4004, re-packetizes those into Packets of the Second Protocol 4012, and transmits the Packets of the Second Protocol 4012 to SW 4007. DN 4003 further receives Packets of the Second Protocol 4012 from SW 4007, re-packetizes those into Packets of the First Protocol 4011, and transmits the Packets of the First Protocol 4011 to EP 4004. And, similarly, DN 4005 receives Packets of the First Protocol 4011 from EP 4006, re-packetizes those into Packets of the Second Protocol 4012, and transmits the Packets of the Second Protocol 4012 to SW 4007. DN 4005 further receives Packets of the Second Protocol 4012 from SW 4007, re-packetizes those into Packets of the First Protocol 4011, and transmits the Packets of the First Protocol 4011 to EP 4006. Within the distributed switch 4000, the two, or more, UP (UP 4002, UP 4009, etc.) and the two, or more, DN (DN 4003, DN 4005, etc.) are working in concert to avoid any deadlocks and/or starvation while, at the same time, re-packetization is performed.

If Bluetooth or USB or PATA or SATA or CAN or LIN, for example, are used for protocol 4011, then the two, or more, RC (RC 4001, RC 4008, etc.) each can be referred to as Host or Master, and the two, or more, EP (EP 4004, EP 4006, etc.) each can be referred to as Device. If PCI Express is used as protocol 4011, then the two, or more, RC (RC 4001, RC 4008, etc.) each can be referred to as the PCI Express RC, and the two, or more, EP (EP 4004, EP 4006, etc.) each can be referred to as the PCI Express EP or can be another UP (as PCI Express allows a tree-like topology), and the two, or more UP (UP 4002, UP 4009, etc.) each can be referred to as the UP, and the two, or more, DN (DN 4003, DN 4005, etc.) each can be referred to as the DN, and switch 4000 can be referred to as a so-called Non-Transparent PCI Express Switch. If GSM or UMTS or LTE or AFDX or Ethernet or EtherCat or ProfiNET or HDBase-T or Sercos or UDP or TCP/IP or WiFi is used for Second Protocol 4012, then SW 4007 can be either a transparent networking switch for the Second Protocol 4012, being totally unaware of the fact that the First Protocol 4011 is tunneled via the Second Protocol 4012. Or, SW 4007 can be a smart switch which is aware of the fact that the First Protocol 4011 is tunneled via the Second Protocol 4012. In this case, SW 4007 has mechanisms as described below to avoid any deadlocks and/or starvation within the distributed switch 4000.

Figure 5:
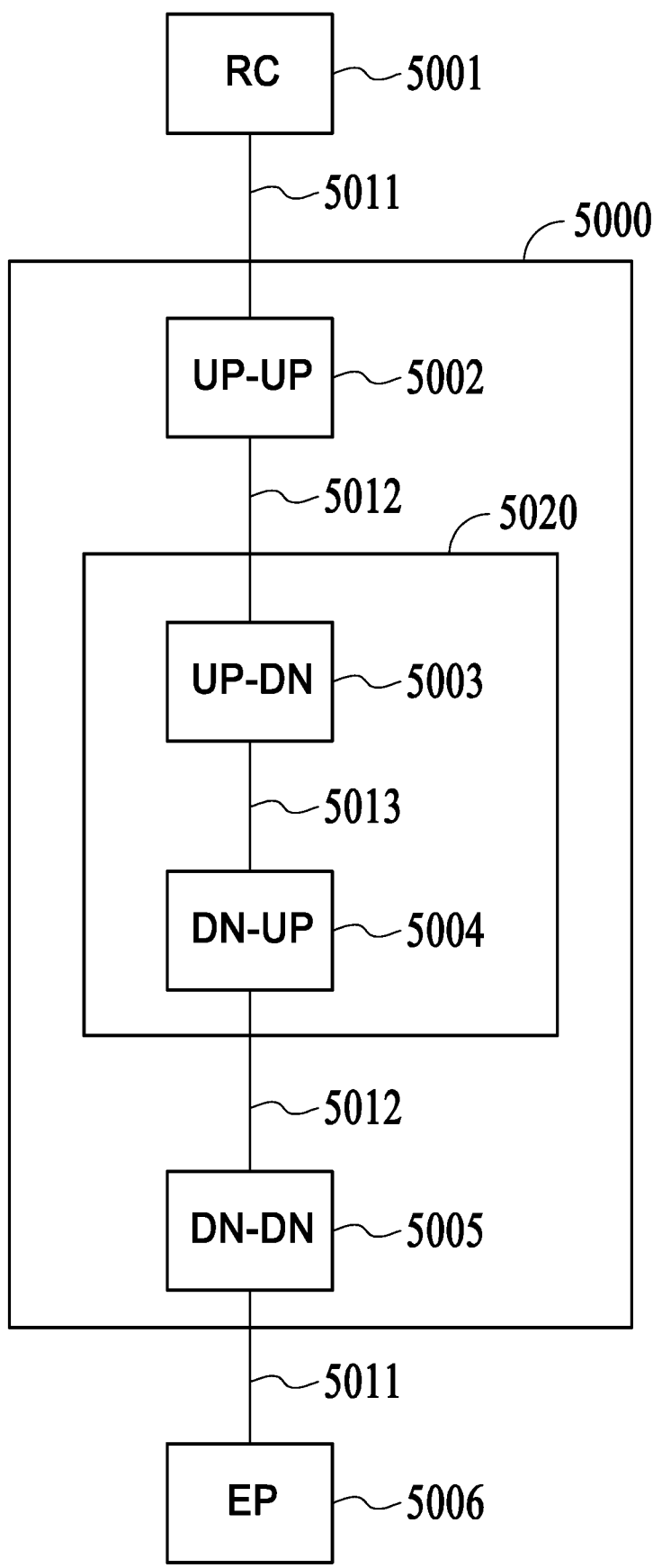
FIG. 5 illustrates a heterogeneous packet-based transport system with a single RC and a single EP, and multiple encapsulated transports.

And yet another embodiment of this invention is the system of FIG. 5 where RC 5001 and EP 5006 are connected via a First Protocol 5011 in a distributed fashion, namely via distributed switch 5000. UP-UP 5002 receives Packets of the First Protocol 5011 from RC 5001, re-packetizes those into Packets of the Second Protocol 5012, and transmits the Packets of the Second Protocol 5012 to UP-DN 5003. UP-UP 5002 further receives Packets of the Second Protocol 5012 from UP-DN 5003, re-packetizes those into Packets of the First Protocol 5011, and transmits the Packets of the First Protocol 5011 to RC 5001. Similarly, DN-DN 5005 receives Packets of the First Protocol 5011 from EP 5006, re-packetizes those into Packets of the Second Protocol 5012, and transmits the Packets of the Second Protocol 5012 to DN-UP 5004. DN 5005 further receives Packets of the Second Protocol 5012 from DN-UP 5004, re-packetizes those into Packets of the First Protocol 5011, and transmits the Packets of the First Protocol 5011 to EP 5006.

Now, within the distributed switch 5000 lies another distributed switch 5020, where UP-DN 5003 receives Packets of the First Protocol 5012 from UP-UP 5002, re-packetizes those into Packets of the third protocol 5013, and transmits the Packets of the third protocol 5013 to DN-UP 5004. UP-DN 5003 further receives Packets of the third protocol 5013 from DN-UP 5004, re-packetizes those into Packets of the Second Protocol 5012, and transmits the Packets of the Second Protocol 5012 to UP-UP 5002. Similarly, DN-UP 5004 receives Packets of the Second Protocol 5012 from DN-DN 5005, re-packetizes those into Packets of the third protocol 5013, and transmits the Packets of the third protocol 5013 to UP-DN 5003. DN-UP 5004 further receives Packets of the third protocol 5013 from UP-DN 5003, re-packetizes those into Packets of the Second Protocol 5012, and transmits the Packets of the Second Protocol 5012 to DN-DN 5005.

Within the distributed switch 5000, and within the distributed switch 5020, UP-UP 5002 and DN-DN 5005, and UP-DN 5003 and DN-UP 5004, resp., are working in concert to avoid any deadlocks and/or starvation while, at the same time, re-packetization is performed.

If Bluetooth or USB or PATA or SATA or CAN or LIN, for example, are used for protocol 5011, then RC 5001 can be referred to as Host or Master, and EP 5006 can be referred to as Device. If PCI Express is used as protocol 5011, then RC 5001 can be referred to as the PCI Express RC, and EP 5006 can be referred to as the PCI Express EP or can be another UP (as PCI Express allows a tree-like topology), and UP-UP 5002 can be referred to as the UP, and DN-DN 5005 can be referred to as the DN, and switch 5000 can be referred to as a so-called Transparent PCI Express Switch.

AFDX or Ethernet or EtherCat or ProfiNET or HDBase-T or Sercos or TSN can, for example, be used for Second Protocol 5012, while another protocol such as GSM or UMTS or LTE or 5G or AFDX or Ethernet or EtherCat or ProfiNET or HDBase-T or Sercos or TSN or UDP or TCP/IP or WiFi can, for example, be used for the third protocol 5013.

This concept of distributed switches within other distributed switches can be called nesting, such distributed switches can then be called nested distributed switches. The concept of building nested distributed switches can be applied to systems with one, or more, RC, and to one, or more, EP. Using additional different protocols, this technique of building nested distributed switches can be done repeatedly (i.e. nested repeatedly), as long as appropriate packet-based transport is used. Obviously, this can be used to transport one, or more, different protocols as a First Protocol over a Second Protocol, or even over a Third Protocol.

The key to building distributed switches, for example distributed switch 1000 or distributed switch 2000 or distributed switch 3000 or distributed switch 4000 or distributed switch 5000 or distributed switch 5020, lies in proper techniques for re-packetizing as well as for avoiding deadlocks and/or starvation. For simplicity, in the following we will describe techniques based on PCI Express as an example for the First Protocol, and TCP/IP as an example for the Second Protocol. Those skilled in the art will readily understand the spirit of the invention and will be able to relate to the various embodiments of this invention when using other packet-based transport for the First Protocol and/or for the Second Protocol and/or for the Third Protocol.

Figure 6:
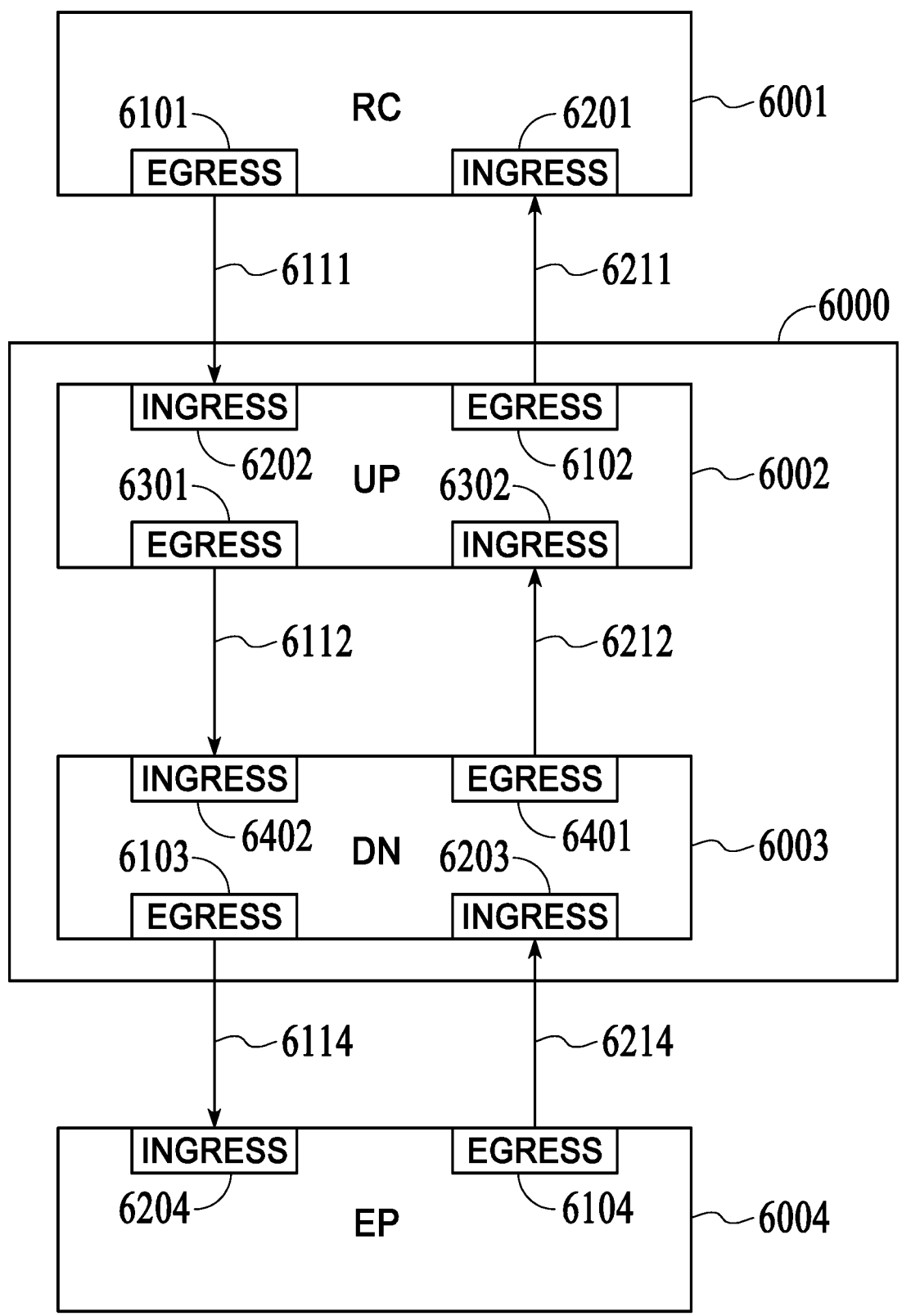
FIG. 6 illustrates a distributed switch with Egress and Ingress ports.

In one embodiment, this invention is a distributed switch, which can be, for example distributed switch 1000 or distributed switch 2000 or distributed switch 3000 or distributed switch 4000 or distributed switch 5000 or distributed switch 5020, is the distributed switch 6000 of FIG. 6.

As shown, RC 6001 and EP 6004 are connected via distributed switch 6000. Or more precisely, the Egress Port 6101 of the RC 6001 sends Packets of the First Protocol via the connection 6111 to the Ingress Port 6202 of the UP 6002, and the Ingress Port 6201 of the RC 6001 receives Packets of the First Protocol via the connection 6211 from the Egress Port 6102 of UP 6002. Similarly, the Ingress Port 6204 of the EP 6004 receives Packets of the First Protocol from the Egress Port 6103 of the DN 6003, via connection 6114. The Egress Port 6104 of the EP 6004 sends Packets of the First Protocol to the Ingress Port 6203 of the DN 6003 via connection 6214. Within the distributed switch 6000, the Egress Port 6301 of the UP 6002 sends Packets of the Second Protocol via the connection 6112 to the Ingress Port 6402 of the DN 6003, and the Ingress Port 6302 of the UP 6002 receives Packets of the Second Protocol via connection 6212 from the Egress Port 6401 of the DN 6003.

PCI Express is a communication protocol based on a packet switching network with multiple protocol layers defining different packet types. For this discussion, the interesting packet type is the Transaction Layer Packet (TLP), which is the highest level packet of PCI Express and travels End-to-End between communication partners across the network. Below the Transaction Layer the Data Link Layer with associated Data Link Layer Packets (DLLP) is responsible for encapsulating and transporting the Transaction Layer Packets Point-to-Point between directly connected link partners. As PCI Express is a packet switching protocol providing reliable communication, Flow Control is necessary to slow down, or backpressure, the Transaction Layer Packet source, if the Transaction Layer Packet sink cannot process Transaction Layer Packets fast enough. Unlike, for example, in the case of TCP/IP, the PCI Express Flow Control is not operating End-to-End, but only Point-to-Point. This creates additional causes for deadlocks and/or starvation when PCI Express is used as the First Protocol which gets transported or tunneled or encapsulated over TCP/IP as the Second Protocol.

The transmit logic of every PCI Express Egress Port, e.g. 6101 of FIG. 6, always knows exactly how much space is left in the link partners Ingress Port Receive FIFO Buffer, e.g. 6202, and will never overflow it. Initially, the Ingress Port, e.g. 6202, will tell the corresponding Egress Port, e.g. 6101, how large its buffers are, and then regularly send updates how much data has been removed from its Receive FIFO Buffer, if any. The size of the receive buffer, as well as the size of data removed from the Receive FIFO Buffer is expressed in units of so-called credits. PCI Express, for example, uses six different types of credits, for three different groups of Transaction Layer Packets, each with separate header and payload credits. The sum of all credits matches the Receive FIFO Buffer size, which basically means that the Receive FIFO Buffer has dedicated space available for each credit type, and that Transaction Layer Packets of one single type cannot fill-up the entire Receive FIFO Buffer.

Keep in mind, that it is mandatory in PCI Express for requesters of completions to have enough space readily available to receive completions, and, therefore, advertise infinite completion credits.

In PCI Express, for example, the different credit groups are: Non-posted request Transaction Layer Packets (requests triggering a completion Transaction Layer Packet as a response—NP), posted request Transaction Layer Packets (requests without a completion Transaction Layer Packet response), and completion Transaction Layer Packets sent in response to a non-posted request Transaction Layer Packet (CPL). As mentioned, each of these three groups can have separate credits for headers and data payload. Although there are these six different, separate flow control categories and flow control counters, PCI Express still enforces certain ordering rules on Transaction Layer Packets even across different Transaction Layer Packet groups. Now, situations can arise, where the credits of one flow control credit group are exhausted, and a Transaction Layer Packet of that same group is to be transmitted next. That Transaction Layer Packet cannot get sent out by the Egress Port logic, e.g. within 6101 in FIG. 6 unless a flow control credit update from the Ingress Port, e.g. 6202, tells the Egress Port logic that credits are available again (for example, because at least one Transaction Layer Packet has been removed from the Receive FIFO Buffer inside the Ingress Port, e.g. 6202). Depending on the ordering rules, a Transaction Layer Packet of a different flow control group which is behind in the Transmit FIFO Buffer and which has sufficient flow control credits available to be sent, will then not be sent.

The most basic ordering algorithm that can be implemented and complies with all but one PCI Express ordering rule is to not change the order of Transaction Layer Packets when processing them. This means the Transaction Layer Packets will be taken out of the Receive FIFO Buffer of the Ingress Port in exactly the same order they have been inserted into the Transmit FIFO Buffer of the Egress Port. While this approach works very well in most applications, it has two potential problems, which are addressed in the PCI Express Specification. First of all, system deadlocks can arise, which led to a mandatory PCIe reordering rule, and secondly, performance is not optimal in certain scenarios, which led to optional reordering rules.

A deadlock situation can arise if two communication participants act according to the producer consumer model described for PCI. Assume one device sends a non-posted read request to the other communication participant, expecting the matching completion Transaction Layer Packet to be received. At the same time, many non-posted read requests are received by the PCI Express device that just sent its own read request. Assume Receive FIFO Buffer flow control credits for non-posted requests are exhausted because of the many incoming requests. If the device is built such, that it only continues to process further received non-posted requests once it received the completion for its own read request, then the PCI Express communication will be blocked forever: No non-posted credits will become available and no completion will be sent to the respective Receive FIFO Buffer.

Figure 7:
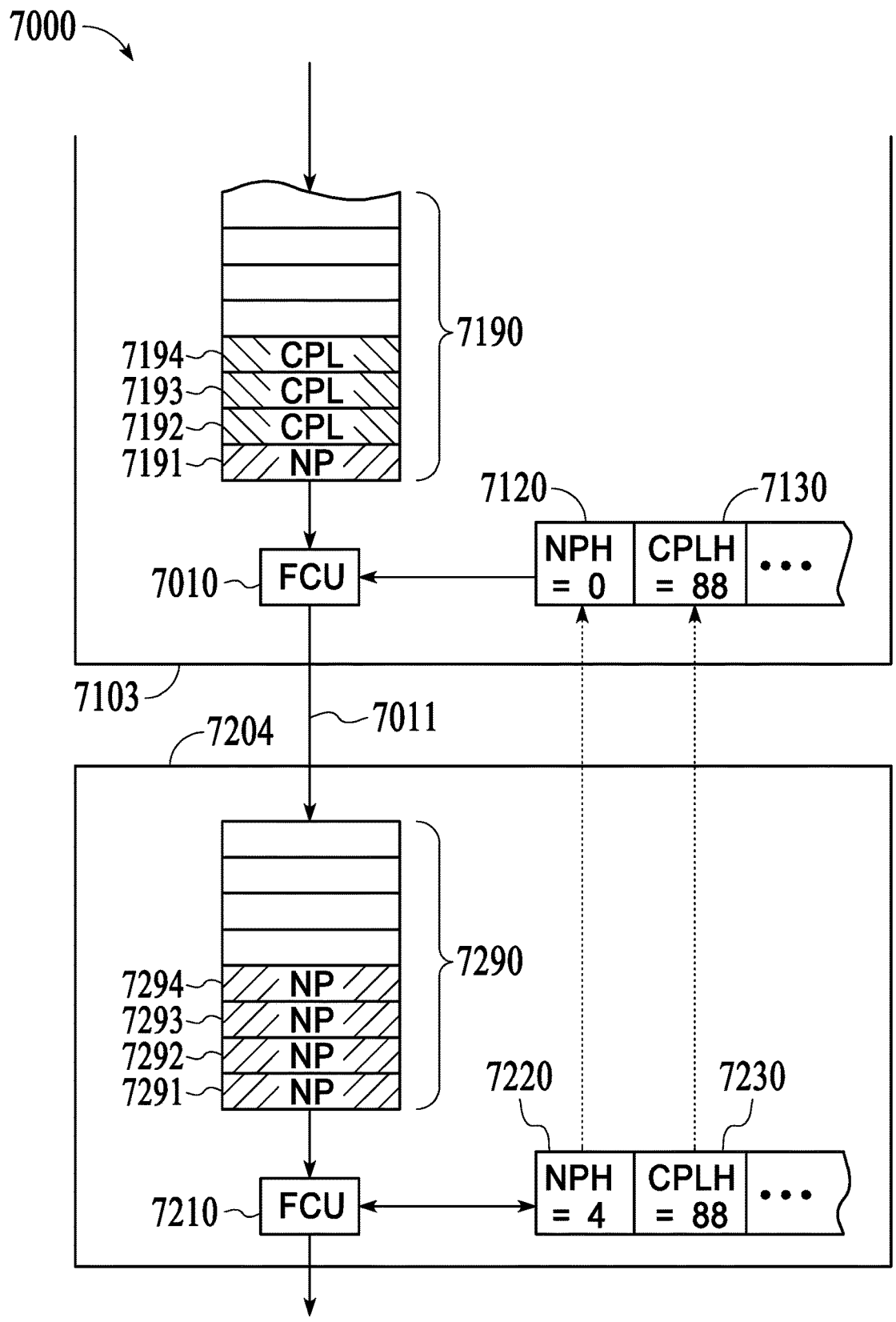
FIG. 7 shows an example of a deadlock in PCI Express.

FIG. 7 shall serve as an example how existing techniques for Flow Control, for example credit-based Flow Control in PCI Express, can lead to deadlocks within the communication over a First Protocol 7011 (which can, for example, be First Protocol 6111 or First Protocol 6114 or First Protocol 6214 or First Protocol 6211) between an Egress Port 7103 (which can, for example, be Egress Port 6101 or Egress Port 6103 or Egress Port 6104 or Egress Port 6102) and an Ingress Port 7204 (which can, for example, be Ingress Port 6202 or Ingress Port 6204 or Ingress Port 6203 or Ingress Port 6201).

The Egress Port 7103 comprises a Transmit FIFO Buffer 7190 which receives Packets from up-stream, buffers the Packets, and eventually sends the Packets to the flow control unit (FCU) 7010. FCU 7010 determines whether Packets can leave the Transmit FIFO Buffer 7190 to be sent out via First Protocol 7011, or not. If Packets get sent out, then they are received by Receive FIFO Buffer 7290 of the Ingress Port 7204. In a credit-based Flow Control technique two, or more, Flow Control Counters, namely no parse header (NPH) Counter 7120, completion header (CPLH) Counter 7130, etc., determine whether FCU 7010 can send out the next Packet. The Flow Control Counters receive updated Flow Control values (or credits) from the Flow Control Status Buffers of the Ingress Port 7204, namely NPH Status Buffer 7220, CPLH Status Buffer 7230, etc. During startup, the Flow Control Status Buffers are initialized with initial values. During operation, the Flow Control Status Buffers are updated with regards to how many Packets of a certain type have been consumed by the application down-stream.

In this example, deadlocks can now occur, if Ingress Port 7204 has only room for a total of 4 so-called NP Packets, while at the same time 4 NP Packets (7291, 7292, 7293, 7294) are already stored in the Receive Buffer 7290 and, therefore, the NPH Counter 7120 has no more credits left (value 0). Now, if one more NP Packet 7191 sits in the Transmit Buffer 7190 waiting to be sent, NP Packet 7191 will not get sent out due to missing credits for NP Packets. Further, if the application down-stream of Ingress Port 7204 is not consuming any NP Packets, maybe because it waits for so-called CPL Packets, the packet-based transport over protocol 7011 will be stalled in a deadlock. The solution to resolve such deadlocks is to let CPL Packet 7192 bypass, or overtake, NP Packet 7191, effectively causing the application down-stream to continue with its process and, eventually, to consume one more NP Packet, thereby, resolving the deadlock.

The PCI Express Specification, for example, demands that completion (and also posted request) Transaction Layer Packets must be able to bypass any non-posted request Transaction Layer Packets. However, they don't have to bypass them in general and always, as this would significantly hurt bandwidth performance, but solely in case of imminent system deadlock.

Multiple options exist to implement this bypassing, overtaking or re-ordering. A simple approach, known in the art, is to always forward any present posted Transaction Layer Packets and completion Transaction Layer Packets before any non-posted requests. While this satisfies all PCI Express ordering and deadlock prevention requirements, it is not optimal with regards to performance: Non-posted requests are small (typically three or four doublewords), while completions and posted requests can be large (up to 4 kByte). As many completers need to take actions with larger latencies when receiving a non-posted request (for example read from DRAM or even backend storage) it is beneficial for response latency to get this request to the completer as soon as possible. Having it overtaken by other, larger Transaction Layer Packets for long times leads to starvation and performance degradation.

Figure 8:
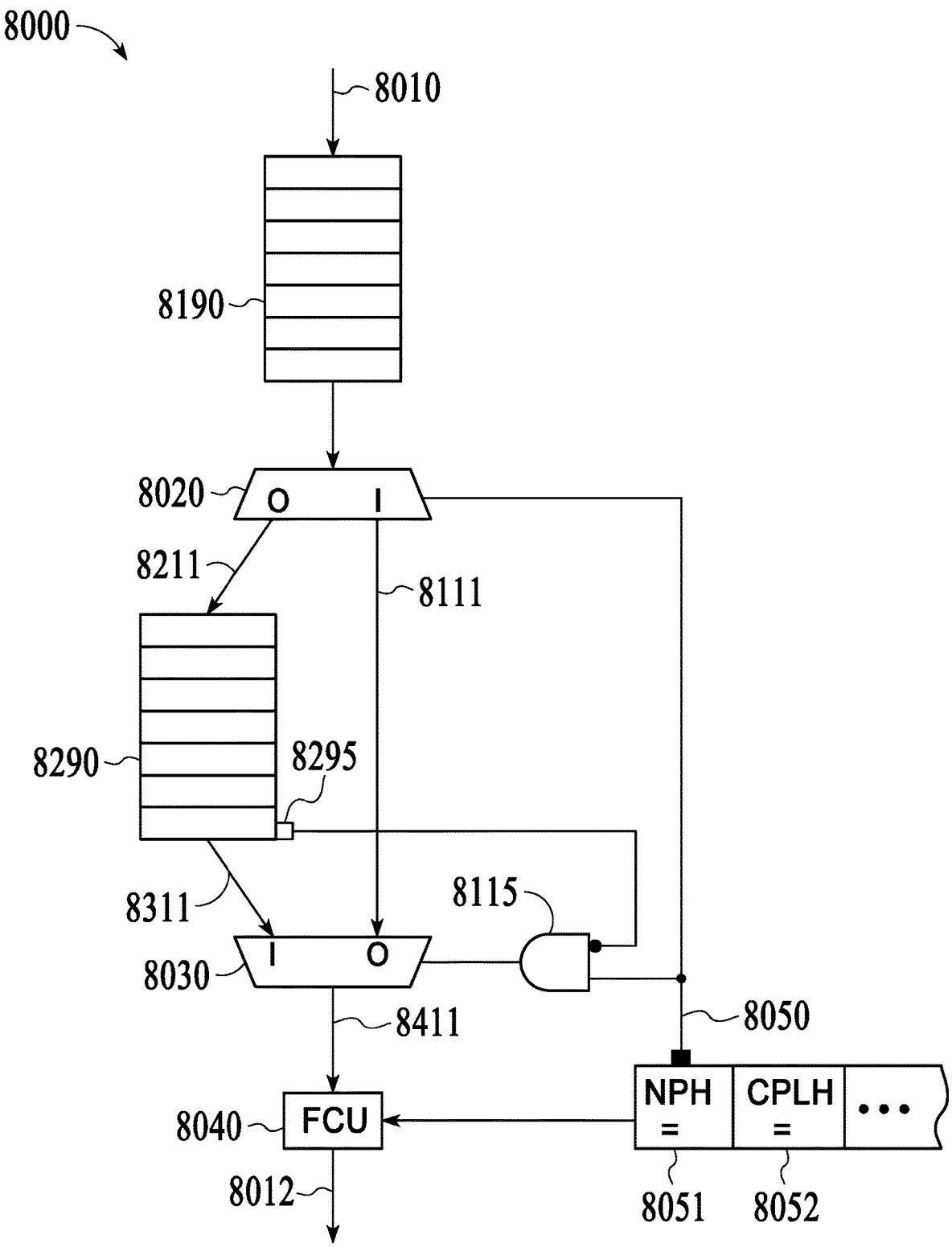
FIG. 8 highlights a simple technique for Transaction Layer Packet (TLP) re-ordering in PCI Express.

Therefore, a simple approach for bypassing, overtaking or re-ordering is known in the art, which is sometimes referred to as cascaded buffers, and which is shown in Egress Port logic 8000 of FIG. 8. Egress Port logic 8000 can, for example, be Egress Port 6101 or Egress Port 6102 or Egress Port 6103 or Egress Port 6104 of FIG. 6. While FIG. 8 shows the technique for re-ordering within the Egress Port logic, similar techniques can be applied for re-ordering within any Ingress Port logic, for example, Ingress Port 6201 or Ingress Port 6202 of Ingress Port 6203 or Egress Port 6204 of FIG. 6. Here, all Packets enter the first Transmit FIFO Buffer 8190 via protocol 8010. In case sufficient credits are available for the corresponding Packet, namely in Flow Control Counter 8051 or in Flow Control Counter 8052, etc. the Packet leaves the Transmit FIFO Buffer 8190 and is sent out over protocol 8011, via Demultiplexer 8020, then via path 8111, then via Multiplexer 8030, then via path 8411, then via the FCU 8040.

In case of insufficient non-posted credits, any non-posted (NP) TLP present at the head of the first Transmit FIFO Buffer 8190 is forwarded via Demultiplexer 8020 into the second Transmit FIFO Buffer 8290, which is used exclusively for non-posted (NP) Transaction Layer Packets. This may now bring the next Packet to the head of the first Transmit FIFO Buffer 8190, and, if it is not a NP TLP, effectively bypassing or overtaking the former Packet via path 8111 and, therefore, may resolve a possible deadlock. As soon as non-posted credits are available again, for example controlled by signal 8050, the Packets in the second Transmit FIFO Buffer 8290 will be sent out over protocol 8012, via path 8311, then via Multiplexer 8030, then via path 8411, and via FCU 8040. Emptying the second Transmit FIFO Buffer 8290 may, preferably, happen with higher priority to achieve highest possible performance. Whether the second Transmit FIFO Buffer 8290 has data available and is used to send data is controlled by the empty flag 8295 and the control element 8115, which also takes available credits into account. In case of any other insufficient credit, the FCU 8040 will block the flow, and the Packet will not be sent out, but held in the first Transmit FIFO Buffer 8190.

The above technique will not be able to predictively avoid deadlocks and/or starvation in the case when a First Protocol such as PCI Express (with point-to-point Flow Control) gets transported or tunneled or encapsulated over TCP/IP (with end-to-end Flow Control) as a Second Protocol, because the Transmit FIFO Buffer 8290 needs to be unpractically large. Other, novel techniques are needed.

Figure 9:
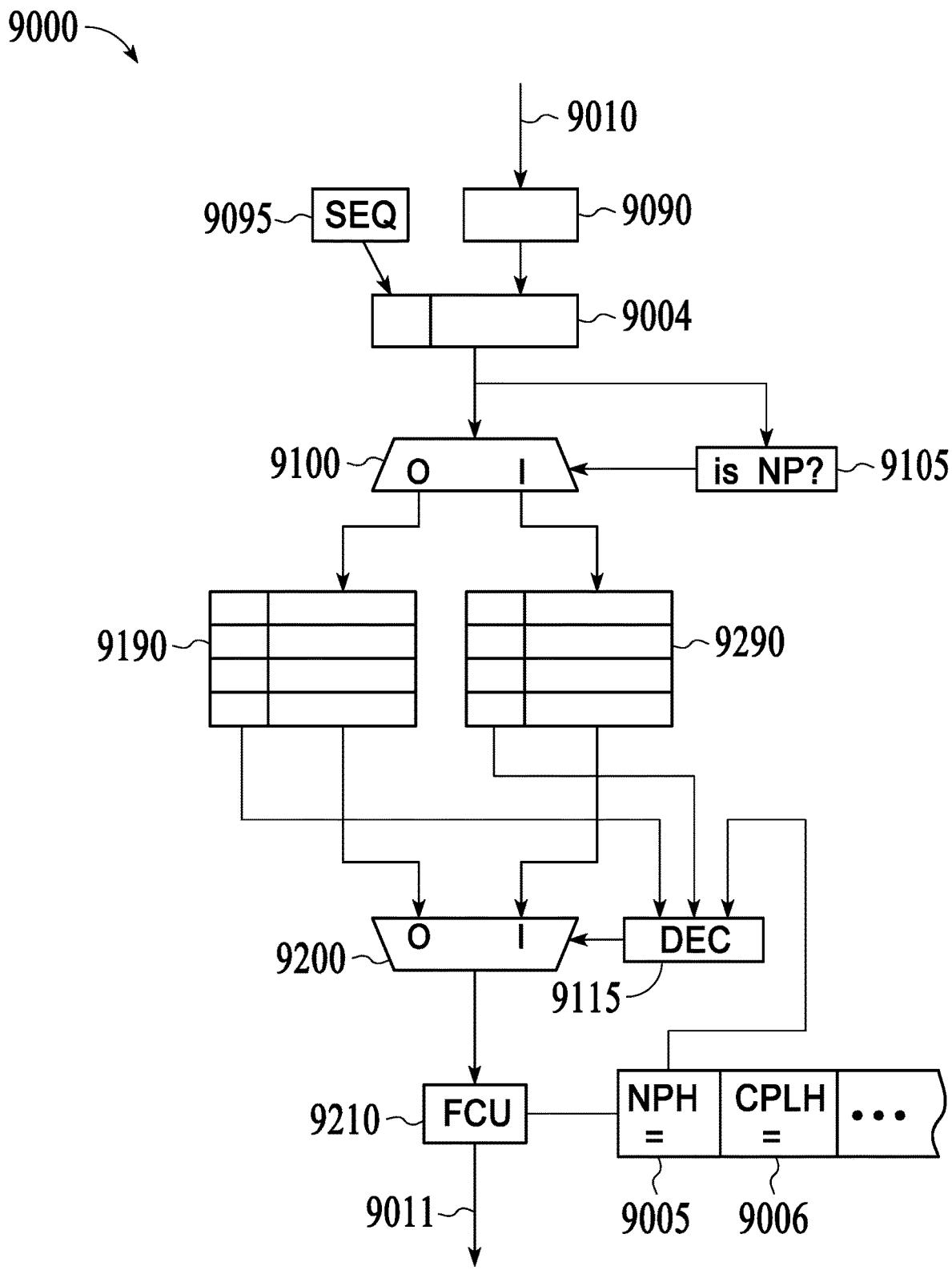
FIG. 9 describes technique for TLP re-ordering in PCI Express using multiple FIFO buffers.

In one embodiment of this invention the distributed switch, for example, distributed switch 1000 or distributed switch 2000 or distributed switch 3000 or distributed switch 4000 or distributed switch 5000 or distributed switch 5020 or distributed switch 6000 implement the Egress Port logic 9000 shown in FIG. 9. I.e., Egress Port logic 9000 can, for example, be Egress Port 6101 or Egress Port 6102 of Egress Port 6103 or Egress Port 6104 of FIG. 6. While FIG. 9 shows the technique for re-ordering within the Egress Port logic, similar techniques can be applied for re-ordering within any Ingress Port logic, for example, Ingress Port 6201 or Ingress Port 6202 of Ingress Port 6203 or Egress Port 6204 of FIG. 6. Here, all Transaction Layer Packets enter the Egress Port via Input 9010, get stored in a TLP Buffer 9090, and a Sequence Number 9095 is added to each incoming TLP, leading to a combined Sequence Number and TLP 9004. Sequence Numbers can, for example, be one unique, incremented number per incoming TLP. For each TLP a Decision 9105 is made whether the TLP is of NP type, which results in splitting Transaction Layer Packets into two, or more, feeds via Demultiplexer 9100. The first feed stores all NP TLP, plus their Sequence Numbers, into Transmit FIFO Buffer 9290. The second feed stores all other Transaction Layer Packets, plus their Sequence Numbers, into Transmit FIFO Buffer 9190. Having two, or more, Transmit FIFO Buffers allows certain Transaction Layer Packets, if needed, to bypass or overtake other Transaction Layer Packets, while maintaining the original TLP ordering. For example, Decision 9115 together with Multiplexer 9200 can decide whether a TLP from Transmit FIFO Buffer 9190 or whether a Transaction Layer Packet from Transmit FIFO Buffer 9290 gets sent to the FCU 9210. Decision 9115 can, for example be made based on each TLP's Sequence Number and available credits from Flow Control Counter 9005 or Flow Control Counter 9006, for example.

In one embodiment of this invention, the Decision 9115 selects TLP from Transmit FIFO Buffer 9290, if the Sequence Number of the next Transaction Layer Packet of Transmit FIFO Buffer 9290 is lower than the Sequence Number from the next Transaction Layer Packet in Transmit FIFO Buffer 9190 and if NP credits are available. Eventually, the FCU 9210 sends the Transaction Layer Packet out via protocol 9011, which can be, for example, protocol 6111 or protocol 6211 or protocol 6114 or protocol 6214 of FIG. 6, if sufficient credits are available in Flow Control Counter 9005 or Flow Control Counter 9006, etc. Depending on the underlying protocol three or more Transmit FIFO Buffers can be used to further separate Packets, based on their type and ordering or bypassing requirements.

As we will demonstrate later the Egress Port logic 9000 of FIG. 9 is not only very applicable to avoiding deadlocks in a point-to-point Flow Control system using one single protocol, but also in distributed systems where First Protocol gets transported or tunneled or encapsulated via a Second Protocol, and where Second Protocol has end-to-end Flow Control. Using the aforementioned techniques, other approaches can be used for bypassing or overtaking or re-ordering of Packets to avoid deadlocks and/or starvation in a packet-based transport system. In one embodiment of this invention, the Egress Port logic can be implemented as a digital circuit. In another embodiment of this invention, the Egress Port logic can be implemented as a function in Programmable Logic of an FPGA. In yet another embodiment of this invention, the Egress Port logic can be implemented using an embedded CPU running software functions that implement aforementioned techniques.

Figure 10:
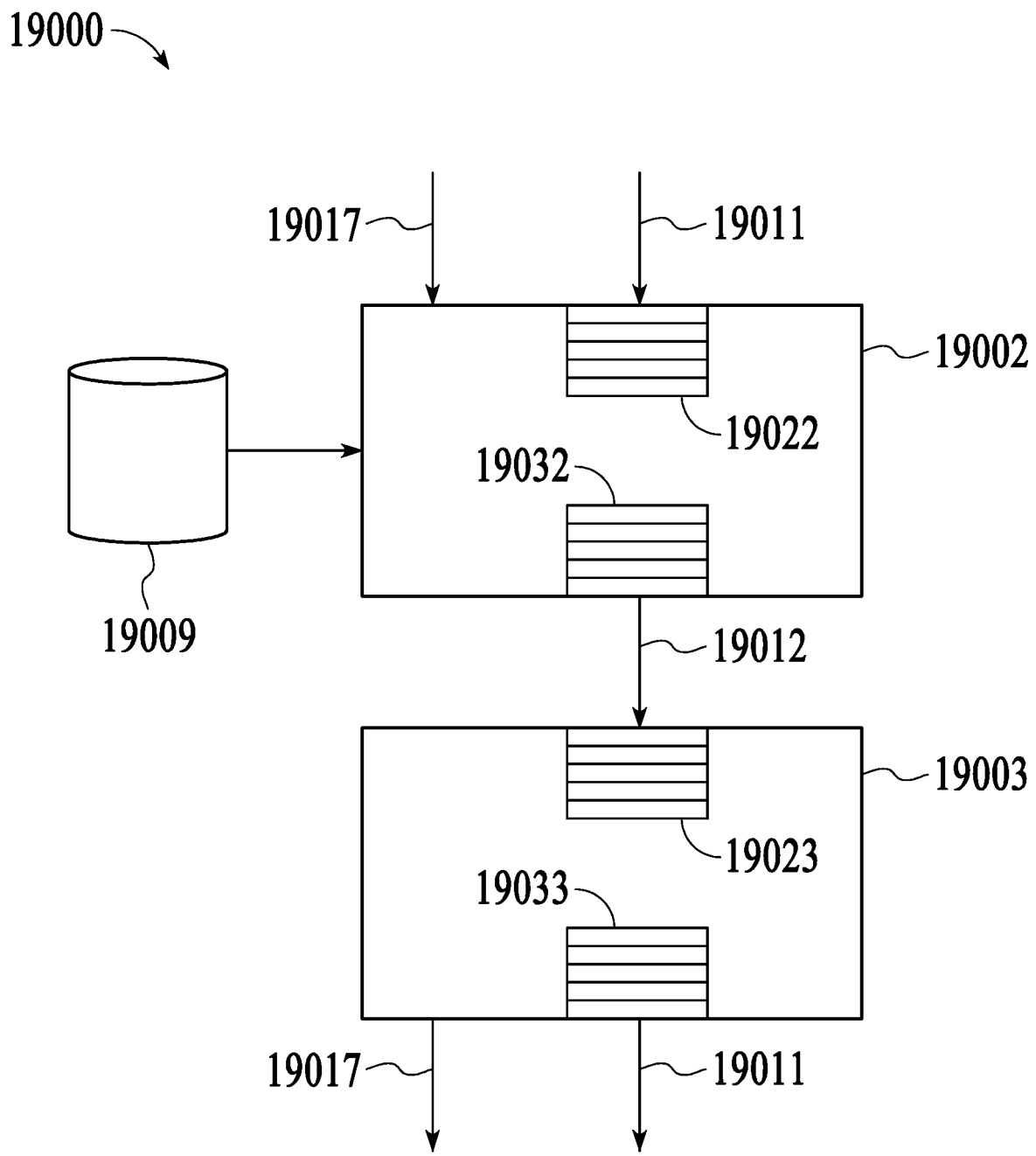
FIG. 10 illustrates various techniques for packetization.

In one embodiment of this invention, to transport Packets of a First Protocol over Packets of a Second Protocol, the Packets of a First Protocol are re-packetized at least twice: At least once on the sender side, and at least once more on the receiver side, as it is described, for example, by Packetization Unit 19000 in FIG. 10.

Packetization Unit 19000 comprises a Transmit Packet Engine 19002 which receives Packets of a First Protocol 19011 and packetizes them into Packets of a Second Protocol 19012 and a Receive Packet Engine 19003 which receives the Packets of a Second Protocol 19012 and re-packetizes them back into Packets of a First Protocol 19011.

Figure 3:
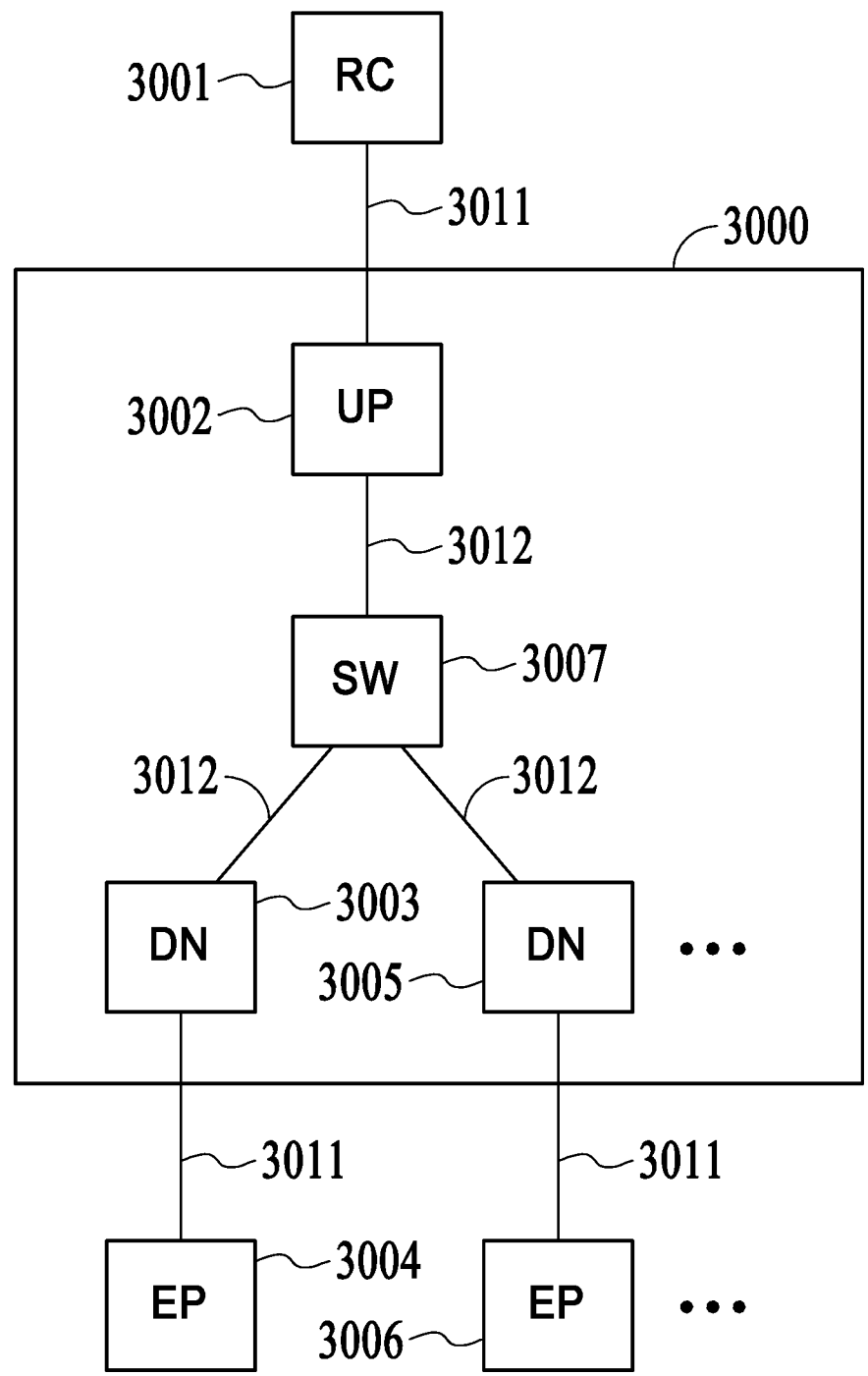
FIG. 3 illustrates a heterogeneous packet-based transport system with a single RC, a switch and multiple EPs.

Transmit Packet Engine 19002 can be implemented, for example, within the Egress Port logic located within UP 1002 of FIG. 1 or within UP 2002 of FIG. 2 or within UP 3002 of FIG. 3 or within UP 4002 of FIG. 4 or within UP 4009 of FIG. 4 or within UP-UP 5002 of FIG. 5 or within UP-DN 5003 of FIG. 5 or within UP 6002 of FIG. 6. Receive Packet Engine 19003 can be implemented, for example, within the Ingress Port logic located within DN 1003 of FIG. 1 or within DN 2003 of FIG. 2 or within DN 2005 of FIG. 2 or within DN 3003 of FIG. 3 or within DN 3005 of FIG. 3 or within DN 4003 of FIG. 4 or within DN 4005 of FIG. 4 or within DN-UP 5004 of FIG. 5 or within DN-DN 5005 of FIG. 5 or within DN 6003 of FIG. 6.

To facilitate re-transmission, re-ordering, bypassing, or overtaking in packet-based transport, or to facilitate implementations in digital circuitry or in Programmable Logic using clock-domain crossings, both, the Transmit Packet Engine 19002 and the Receive Packet Engine 19003, can use FIFO buffers for ingress and egress communication, thus can have Receive FIFO Buffer 19022, or Receive FIFO Buffer 19023, resp., and can have Transmit FIFO Buffer 19032, or Transmit FIFO Buffer 19033, resp.

In one embodiment of this invention, re-packetization within Receive Packet Engine 19003 extracts the Packets of a First Protocol from the payload of the Packets of a Second Protocol. If Packets of a First Protocol have been segmented over multiple Packets of a Second Protocol, then the Receive Packet Engine needs to re-assemble the Packets of a First Protocol and transmit the Packets of a First Protocol as soon as possible, every single time a complete Packet of the First Protocol is re-assembled, to avoid any additional latencies.

In another embodiment of this invention, the Receive Packet Engine will send out the Packets of a First Protocol in accordance to a predetermined minimum and maximum latency, to facilitate a deterministic latency behavior.

While protocols do not support Frame Preemption (or, sometimes also called Packet Preemption), which means that the transmission of a subsequent packet may interrupt the transmission of a preceding packet, Frame Preemption can be used when encapsulation Packets of a First Protocol over Packets of a Second Protocol. TSN, for example, comprises the option for one datastream to preempt frames (or packets) of another datastream. Thus, in TSN a single level of preemption is allowed. Now, with regards to our invention, if a First Protocol allows Frame Preemption but the Second Protocol does not, then multiple packets of the second protocol can just represent the datastream. However, if the Second Protocol also allows Frame Preemption then different Packets of the First Protocol may preempt Packets of each other (which, btw. introduces fragmentation).

The method of preemption may be used to respect different priorities within a second protocol carrying first level protocols.

Obviously, by achieving a deterministic latency behaviour certain real-time behaviour is also achieved. And, obviously, certain time information, sometimes referred to as time-stamping, can be extracted, forwarded and/or transported, and used for synchronization with a common clock (sometimes known as the Grandmaster Clock) and/or for tracking duration for sending and receiving packets in the network. For example, TSN in accordance to IEEE 1588v2, or IEEE 802.1AS, supports time synchronization using particular packets defined within the protocol. Or, PCIe according to the PCIe Base Specification 3.1, or newer, supports the concept Precision Time Measurement (PTM) for time synchronization and packet travel times. In the heterogeneous packet-based transport system according to one embodiment of this invention such time synchronization packets of the First Protocol can be encapsulated and transported, or tunneled, via Packets of a Second Protocol. And, the Ingress Port of a distributed switch receiving Packets of the First Protocol can also be used for identifying the time synchronization packets of the First Protocol, can further extract the time information for setting an synchronized clock internal to the distributed switch, and can compute time synchronization packets of the Second Protocol from the time synchronization packets of the First Protocol to send time synchronization packets of the Second Protocol natively over the Second Protocol. One benefit of such a heterogeneous time synchronization scheme is to increase the time precision by reducing transport latencies.

In one embodiment of this invention, the Packetization Unit 19000 can have a Database 19009 to hold a selection of software programs for a CPU inside the Transmit Packet Engine 19002, or configuration information for Programmable Logic inside the Transmit Packet Engine 19002, or other algorithms or methods for controlling how Packets of a First Protocol get packetized into Packets of a Second Protocol by the Transmit Packet Engine. The contents of the Database then controls how packetization occurs in response to system requirements, for example, as packetizing Packets of a First Protocol into Packets of a Second Protocol can have significant positive, or negative, effects on the distributed system's behavior, including bandwidth and propagation latency, or other real-time and real-time networking behavior.

In another embodiment of this invention the Packetization Unit 19000 can have a Database 19009 that is controlling the Transmit Packet Engine 19002 to optimize for maximum transport bandwidth: Since each of the Packets of a Second Protocol adds protocol overhead, generating more Packets of a Second Protocol reduces the overall bandwidth of Packets of a First Protocol that can be transported over a fixed rate network of the Second Protocol. With respect to increasing the bandwidth it is therefore beneficial to pack as many Packets of a First Protocol into as few Packets of a Second Protocol as possible. This can be done by aggregating multiple Packets of a First Protocol into a single Packet of the Second Protocol. However, the Packets of a First Protocol do not necessarily arrive in a continuous stream but with pauses. In case of a pause, while the Transmit Packet Engine generates as large Packets of a Second Protocol as possible, the Transmit Packet Engine has to wait for new Packets of a First Protocol to become available for packetization. This waiting, in the worst case, can create infinite blocking, if no new Packets of a First Protocol become available. Therefore, a timeout can be used, which triggers transmission of a Packet of the Second Protocol even if Packet of the Second Protocol could still hold one, or more Packets of a First Protocol. The waiting, of course, can have a negative effect on the propagation latency of individual Packets of a First Protocol. In the worst case, some Packets of a First Protocol are delayed up to the timeout value, which again reduces overall system performance.

In yet another embodiment of this invention the Packetization Unit 19000 can have a Database 19009 that is controlling the Transmit Packet Engine 19002 to optimize for maximum transport bandwidth while maintaining lowest possible propagation delays for selected Packets of a First Protocol: Thus, instead of a fixed aggregation timeout for all types of Packets of a First Protocol, more advanced algorithms which are aware of the details of the First Protocol allow to tradeoff between bandwidth and latency, for example as follows: Using the example of PCI Express, read request latency is crucial to system performance. An advanced algorithm for the Transmit Packet Engine can switch to a smaller aggregation timeout once it encounters that a read request is to be packetized. Or, sometimes interrupt latency is an important factor of system performance. Since interrupts happen relatively seldom compared to other types of traffic, the bandwidth impact is relatively low, when sending a Packet of the First Protocol, which holds an interrupt, out as immediately after it has been packetized into a Packet of the Second Protocol.

In yet another embodiment of this invention, the Packetization Unit 19000 can have a Database 19009 that is controlling the Transmit Packet Engine 19002 to handle certain predetermined Packets of a First Protocol differently than other Packets of a First Protocol, using techniques such as Deep Packet Inspection or Quality-of-Service or adaptive techniques or Deep-Learning techniques. For example, in modern PCI Express interrupts are signaled following the so-called MSI or so-called MSI-X scheme, which means they look like any other PCI Express Packet for a memory write, but memory writes with a payload of exactly four Bytes that are always propagating in the upstream direction towards the RC. These properties can be used, for example, by an algorithm to detect Packets of a First Protocol that relate to PCI Express interrupts and use a low-latency approach for packetization.

Adding application software knowledge, an algorithm of Database 19009 can, for example, further inspect the target address of the PCI Express memory write. In the case of PCI Express interrupts a particular, predetermined address matches one of many of the RC MSI or MSI-X triggering addresses, which are known to the application software. All other PCI Express Packets which do not target the addresses, can be dealt with differently, for example by optimizing for bandwidth.

Some protocols require additional so called sideband signals, which are external signals or internal states that are not part of the regular Packets of a First Protocol, but need to be transported or tunneled or encapsulated over the Second Protocol. Therefore, in yet another embodiment of this invention the Transmit Packet Engine 19002 can have an optional input 19017 for the sideband signals, and the Receive Packet Engine 19003 can have an optional output 19017 for the sideband signals. For the example of PCI Express these sideband signals include, but are not limited to, the reset signal PERST #, the power management related signals CLKREQ # and WAKE #, and for PCI Express switches the change of the internal power states of the up-stream and the downstream ports. These sideband signals can be treated as Packets, or as non-packet-based, direct signals, and the Transmit Packet Engine 19002 can take the value of the sideband signals and can transport them via the Second Protocol 19012 to the Receive Packet Engine 19003 which then unpacks the sideband signals values and outputs them accordingly.

Figure 11:
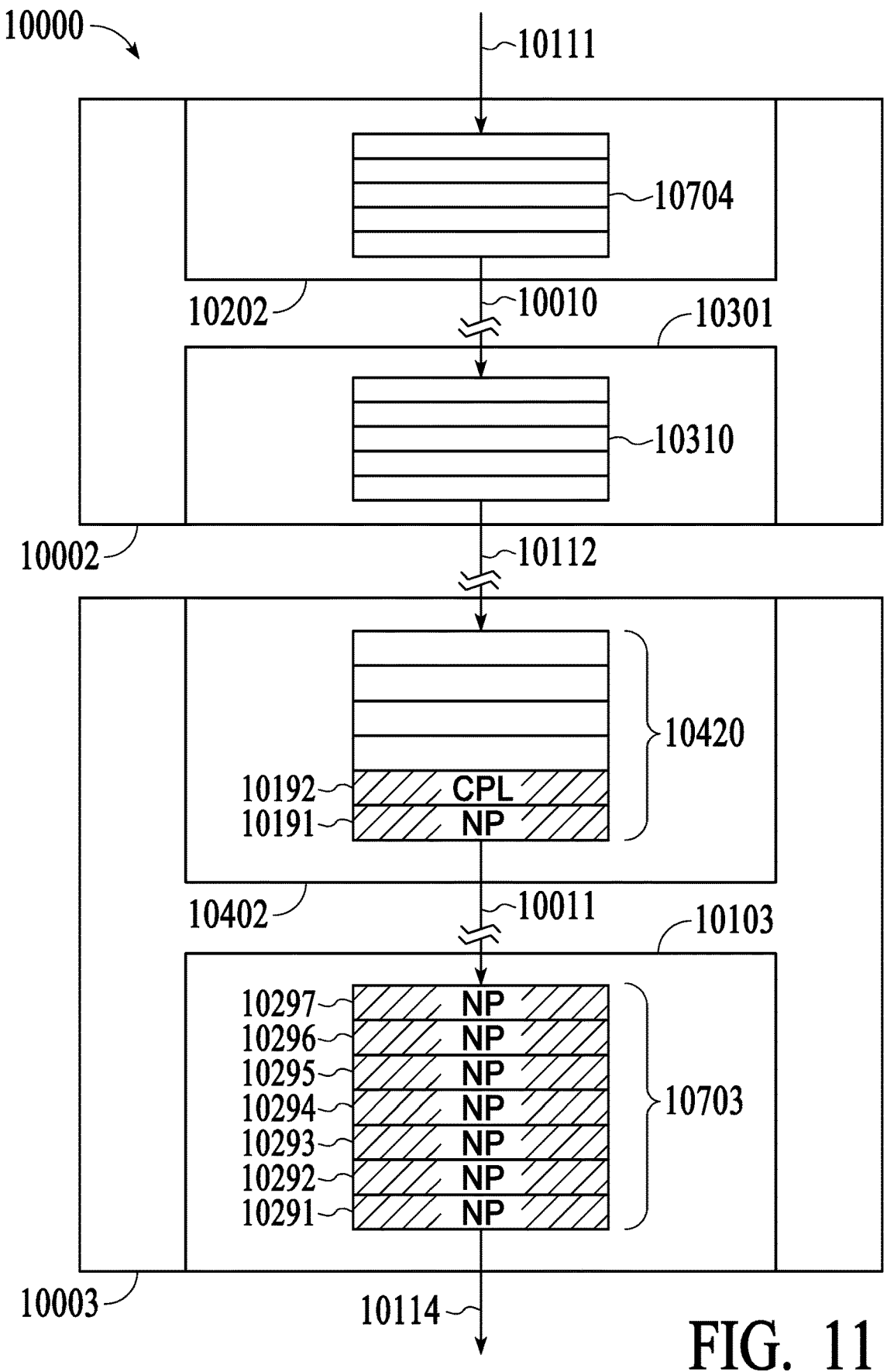
FIG. 11 gives an example of a possible deadlock in a heterogeneous packet-based transport system.

When building a heterogeneous packet-based transport system, for example the system shown in FIG. 6, where Packets of a First Protocol are transported or tunneled or encapsulated via Packets of a Second Protocol, existing techniques for avoiding deadlocks and/or starvations become inapplicable, and non-trivial to solve. This is highlighted in FIG. 11, where UP 10002 can, for example, be UP 6002, where INGRESS 10202 can, for example, be Ingress Port 6202, and where EGRESS 10301 can, for example, be Egress Port 6301, and where DN 10003 can, for example, be DN 6003, and where INGRESS 10402 can, for example, be Ingress Port 6402, and where EGRESS 10103 can, for example, be Egress Port 6103. Receive FIFO Buffer 10704 and Transmit FIFO Buffer 10703 process Packets of a First Protocol, and can be capable of re-ordering Packets in accordance to the First Protocol, and only to First Protocol. The combination of Receive FIFO Buffer 10704 and Transmit FIFO Buffer 10703 can, for example, comprise re-ordering or bypassing or overtaking logic as described for Ingress Port 7204 and, resp., for Egress Port 7103. Transmit FIFO Buffer 10310 and Receive FIFO Buffer 10420 process Packets of a Second Protocol, and are capable of handling Packets in accordance to the Second Protocol, and only to the Second Protocol. More precisely, Transmit FIFO Buffer 10310 and Receive FIFO Buffer 10420 are not aware of details of the First Protocol, neither are not able to re-order any Packets in accordance to the First Protocol. Solely for explanatory purposes, in FIG. 11 we use the example of PCI Express as the First Protocol and TCP/IP as Second Protocol, where a deadlock situation shown in FIG. 11 can arise: If for the PCI Express connection 10114 (i.e. First Protocol) no more NPH credits are available, and the PCI Express Transmit FIFO Buffer 10703 (of First Protocol) is completely filled with NP Transaction Layer Packets 10291 . . . 10297, then the NP Transaction Layer Packet 10191 and the CPL Transaction Layer Packet 10192, transported or tunneled or encapsulated over TCP/IP (i.e. Second Protocol), cannot leave the TCP/IP Receive FIFO Buffer 10420 (of Second Protocol). Because the TCP/IP Receive FIFO Buffer 10420 (i.e. Second Protocol) cannot reorder any Packets in accordance to First Protocol, and the PCI Express Receive FIFO Buffer 10703 (of First Protocol) has no CPL Trans-action Layer Packets available to reorder, the system is in deadlock as long as no further NP credits are provided by the application over the PCI Express connection 10114 (i.e. First Protocol). A similar situation arises, if the CPL TLP 10192 would be stuck in Transmit FIFO Buffer 10310 or in Receive FIFO Buffer 10704, such as in the case that all FIFO buffers on the path to the PCI Express Transmit FIFO Buffer 10703 were completely filled.

Figure 12:
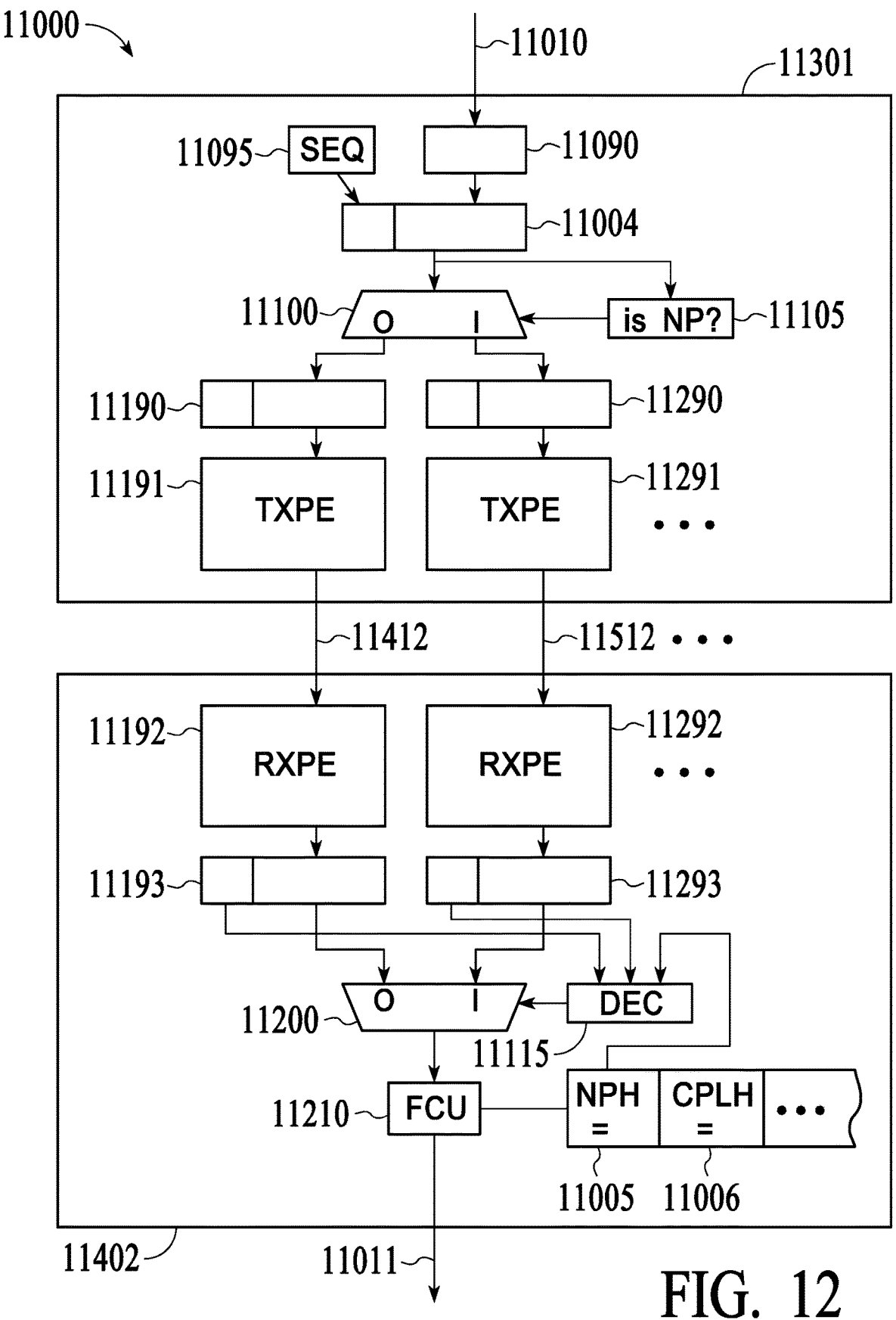
FIG. 12 describes a novel technique for avoiding deadlocks in a heterogeneous packet-based transport system.

In one other embodiment, our invention uses the technique described in FIG. 12. Shown here is an Egress Port 11301 which can, for example, be the Egress Port 6301 or the Egress Port 6401 from FIG. 6, receiving Packets of a First Protocol on input 11010, and an Ingress Port 11402 which can, for example, be the Ingress Port 6302 or the Ingress Port 6402 from FIG. 6, transmitting Packets of a First Protocol on output 11011, and where the Egress Port 11301 transmits Packets of a Second Protocol over two, or more, connections, namely connection 11412 and connection 11512 etc., and where the Ingress Port 11402 receives the Packets of a Second Protocol via the two, or more, connections. Connection 11412 or connection 11512 can, for example, be connection 6112 or connection 6212 from FIG. 6. Input 11010 can, for example, be connection 6111 or connection 6214 from FIG. 6. Output 11011 can, for example, be connection 6211 or connection 6114 from FIG. 6.

In accordance to one embodiment of this invention, and utilizing the techniques described in FIG. 9, the Egress Port 11301 can augment each Packet of the First Protocol, stored in buffer 11090, with a Sequence Number, leading to a combined Sequence Number and Packet of the First Protocol 11004. The Packets are then, again utilizing the techniques described in FIG. 9, directed to two, or more, Transmit Packet Engine, for example Transmit Packet Engine 11191 and Transmit Packet Engine (TXPE) 11291, via the intermediate FIFO buffer 11190 and intermediate FIFO buffer 11290, etc. In yet another embodiment of this invention, Transmit Packet Engine 11191 and Transmit Packet Engine 11291, etc., re-packetize Packets of a First Protocol into Packets of a Second Protocol utilizing the various techniques described in FIG. 10. The Packets of a Second Protocol packetized by Transmit Packet Engine 11191 are sent via the Second Protocol over the connection 11412 where they are received by Receive Packet Engine 11192 as Packets of a Second Protocol. Receive Packet Engine 11192 extracts the Packets of a First Protocol from the Packets of a Second Protocol, as described in the various techniques above, and sends the resulting Packets of a First Protocol to the intermediate FIFO buffer 11193. Separately, the Packets of a Second Protocol packetized by Transmit Packet Engine 11291 are sent via the Second Protocol over the connection 11512 where they are received by Receive Packet Engine 11292 (RXPE) as Packets of a Second Protocol. Receive Packet Engine 11292 extracts the Packets of a First Protocol from the Packets of a Second Protocol as described in the various techniques above, and send the resulting Packets of a First Protocol to the intermediate FIFO buffer 11293.

In utilizing the techniques described before, from FIFO buffer 11193 and from FIFO buffer 11293 etc. the decision logic (DEC) 11115, which can, for example, be Decision 9115 from FIG. 9, and multiplexer 11200 can combine the two, or more, streams of information according to the Sequence Numbers and the requirements of the Flow Control of the First Protocol 11011. Such Flow Control requirements can be represented by the Flow Control Unit (FCU) 11210 and the Flow Control Counter 11005 and the Flow Control Counter 11006, etc.

In accordance to one embodiment of this invention, each connection, from the Transmit Packet Engines to the Receive Packet Engines, can be a separate and independent packet-based transport based on the Second Protocol, over one, or more, physical or virtual, connections. Such an independent packet-based transport can be referred to as a Session in protocols like, for example, TCP/IP or HDBaseT. Each different Session can use an independent Flow Control and can utilize one or more packet-based transports. For the example of PCI Express, to implement deadlock avoidance in a heterogeneous packet-based transport system in accordance to one embodiment of this invention, one possible implementation would, for example, choose two pairs of buffers with respective two packet-based transport of the Second Protocol, the packet-based transport 11412 transporting only non-NP Transaction Layer Packets and the packet-based transport 11512 transporting only NP Transaction Layer Packets. Since NP and non-NP Transaction Layer Packets are transported in separate and independent packet-based transports of the Second Protocol, there is no requirement for re-ordering within each of the packet-based transports. Because the Egress Port 11301 attaches a unique and monotonically incrementing by one Sequence Number to each Transaction Layer Packet, generated by the Sequence Number Generator 11095, the Ingress Port 11402 can restore the Transaction Layer Packet order and adhere to the PCI Express specification requirements. The Ingress Port 11402 can also decide to forward Transaction Layer Packets of the non-NP buffer 11192 before the NP Transaction Layer Packets of buffer 11292 to avoid deadlock.

Figure 13:
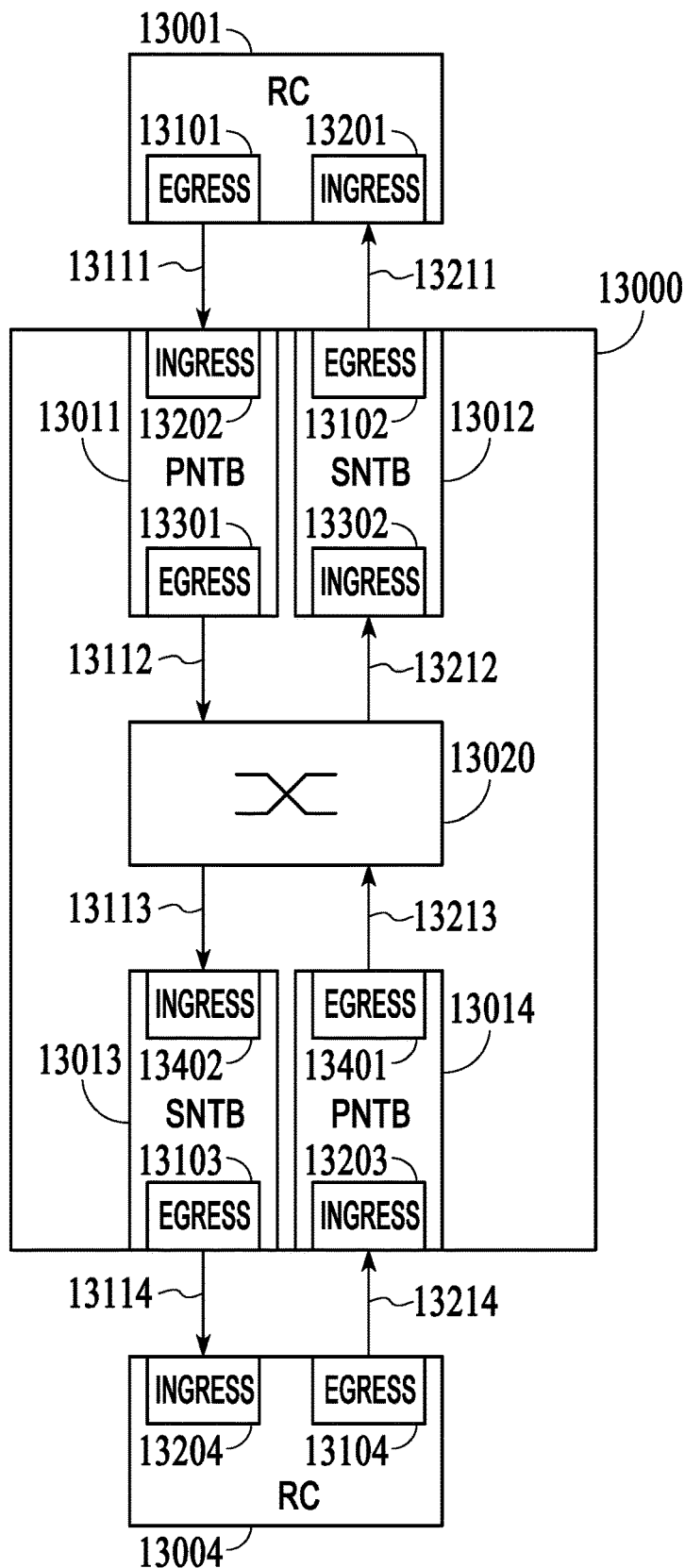
FIG. 13 describes a distributed switch connecting two RC, back-to-back.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims. Various applications can benefit from such a heterogeneous packet-based transport. In one embodiment, this invention can not only be used to connect one or more EP with one or more RC but it can also be used to connect multiple RC with each other by transporting the packets of a First Protocol, which can be PCIe, for example, over a Second Protocol, which can be TCP/IP, for example. This is shown in FIG. 13 where a first RC 13001 is connected with a second RC 13004 via the distributed switch 13000, effectively enabling both RCs to exchange data with each other. Or more precisely, the Egress Port 13101 of RC 13001 sends Packets of a First Protocol via the connection 13111 to the Ingress Port 13202 of the PNTB 13011, and the Ingress Port 13201 of the RC 13001 receives Packets of the First Protocol via connection 13211 from the Egress Port 13102 of the SNTB 13012. Similarly, the Ingress Port 13204 of the RC 13004 receives Packets of the First Protocol via connection 13114 from the Egress Port 13103 of the SNTB 13013 and the Egress Port 13104 send Packets of the First Protocol via connection 13214 to the Ingress Port 13203 of the PNTB 13014. Within the distributed switch 13000, the Egress Port 13301 of the PNTB 13011 sends Packets of the Second Protocol via the connection 13112 and via connection 13113 to the Ingress Port 13402 of the SNTB 13013, and the Ingress Port 13302 of the SNTB 13012 receives Packets of the Second Protocol via connection 13212 and via connection 13213 of the Egress Port 13401 of the PNTB 13014. Optionally, within the distributed switch 13000 can be the Multi-Connect 13020 which, for example, can be an On chip Network such as AXI or a hardware/software Crossbar or a Layer-2 Ethernet network switch. Within the PNTB, for example PNTB 13011 or PNTB 13014, or the SNTB, for example SNTB 13012 or SNTB 13013, certain translations can be performed. By inspecting and understanding the payload or the data within the Packet of the First Protocol, memory address values which relate to the sender's address space can be translated to address values which relate to the receiver's address space. Or, in-band signals which relate to the sender's domain can be translated to in-band signals which relate to the receiver's domain. Furthermore, additional safety checks can be performed by the PNTB or by the SNTB to either protect the sender side or to protect the receiver side.

For example, for applications which utilize PCIe as the First Protocol and which require a high level of reliability and/or High Availability and/or Functional Safety the PTNB 13011 and PNTB 13014 can be a PCIe Primary Non-Transparent Bridge and the SNTB 13013 and the SNTB 13012 can be a PCIe Secondary Non-Transparent Bridge, both of which also can perform safety checks between the PCIe domain of the RC directly connected to it and the PCIe domain remotely connected. Safety checks can be, for example, memory addresses to be within a predetermined address range, validity of in-band or side-band signals, etc.

Figure 14:
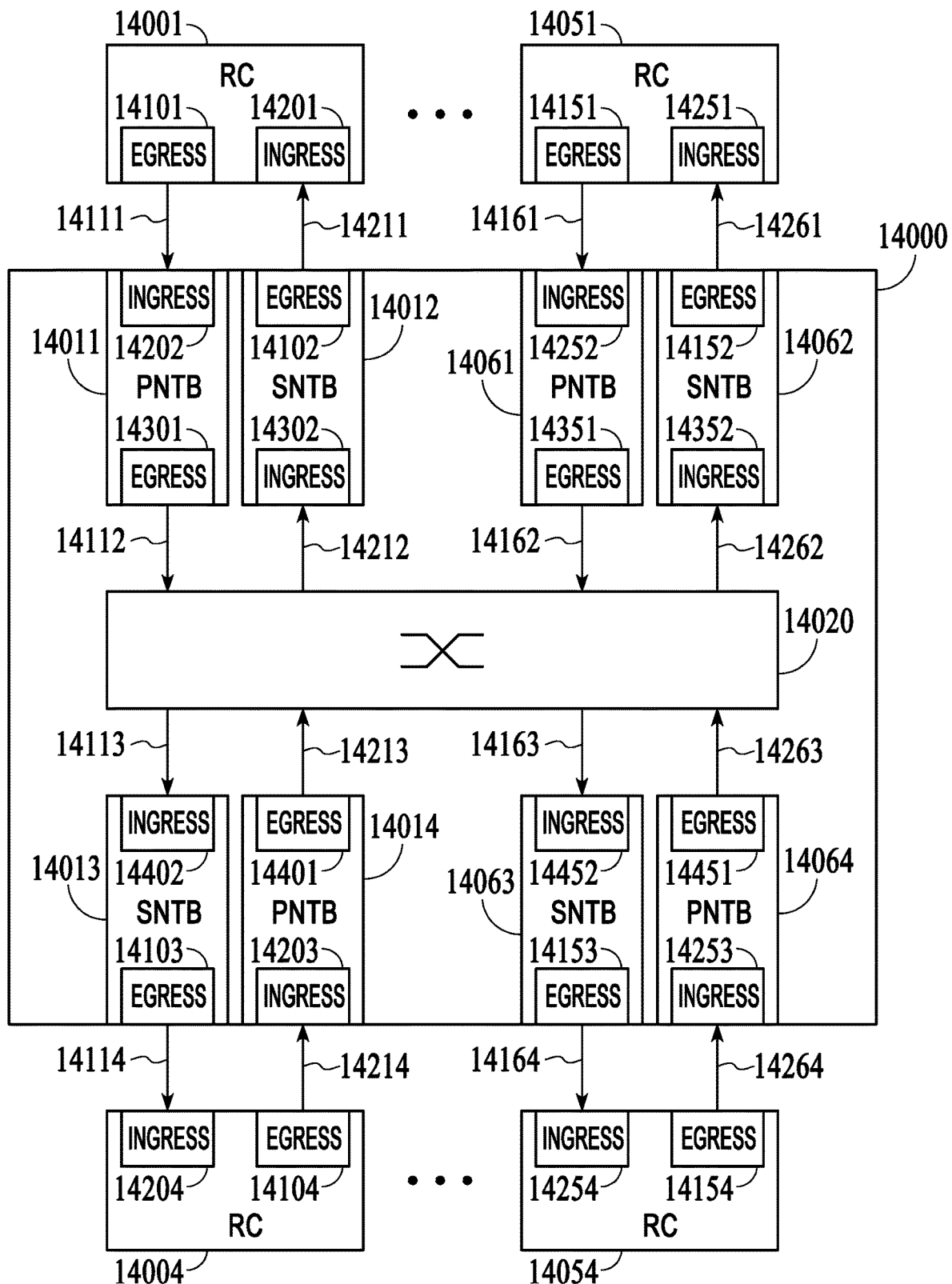
FIG. 14 describes a distributed switch which connects multiple RC with each other.

Obviously, more than two RC can be connected via such a distributed switch. This is, for example, described in FIG. 14 where multiple RCs can exchange data with each other via distributed switch 14000. Each RC, which is RC 14001, RC 14004, RC 14051, RC 14054, has an Egress Port which is Egress Port 14101, or Egress Port 14104, or Egress Port 14151, or Egress Port 14154, respectively, to send Packets of the First Protocol via a connection, which is connection 14111, or connection 14214, or connection 14161, or connection 14264, respectively, to the Ingress Port, which is Ingress Port 14202, or Ingress Port 14203, or Ingress Port 14252, or Ingress Port 14253, respectively, of the respective PNTB, which is PNTB 14011, or PNTB 14014, or PNTB 14061, or PTNB 14064, respectively. And each RC, which is RC 14001, RC 14004, RC 14051, RC 14054, has an Ingress Port, which is Ingress Port 14201, or Ingress Port 14204, or Ingress Port 14251, or Ingress Port 14254, respectively, which receives Packets of the First Protocol via a connection, which is connection 14211, or connection 14114, or connection 14261, or connection 14164, respectively, from the Egress Port, which is Egress Port 14102, or Egress Port 14103, or Egress Port 14152, or Egress Port 14153, respectively, of the respective SNTB, which is SNTB 14012, or SNTB 14013, or SNTB 14062, or SNTB 14063, respectively. Each PNTB, which is PNTB 14011, or PNTB 14014, or PNTB 14061, or PNTB 14064, has an Egress Port, which is Egress Port 14301, or Egress Port 14401, or Egress Port 14351, or Egress Port 14451, respectively, further sends Packets of the Second Protocol via a connection, which is connection 14112 and connection 14113, or connection 14213 and connection 14212, or connection 14162 and connection 14163, or connection 14263 and connection 14262, respectively, to the corresponding Ingress port, which is Ingress Port 14402, or Ingress Port 14302, Ingress Port 14452, Ingress Port 14352, of the corresponding SNTB, which is SNTB 14013, or SNTB 14012, or SNTB 14063, or SNTB 14062. These Packets of the Second Protocol can, optionally, be transported via the Multi-Connect 14020 which, for example, can be an On chip Network such as AXI or a hardware/software Crossbar or a Layer-2 Ethernet network switch.

Figure 15:
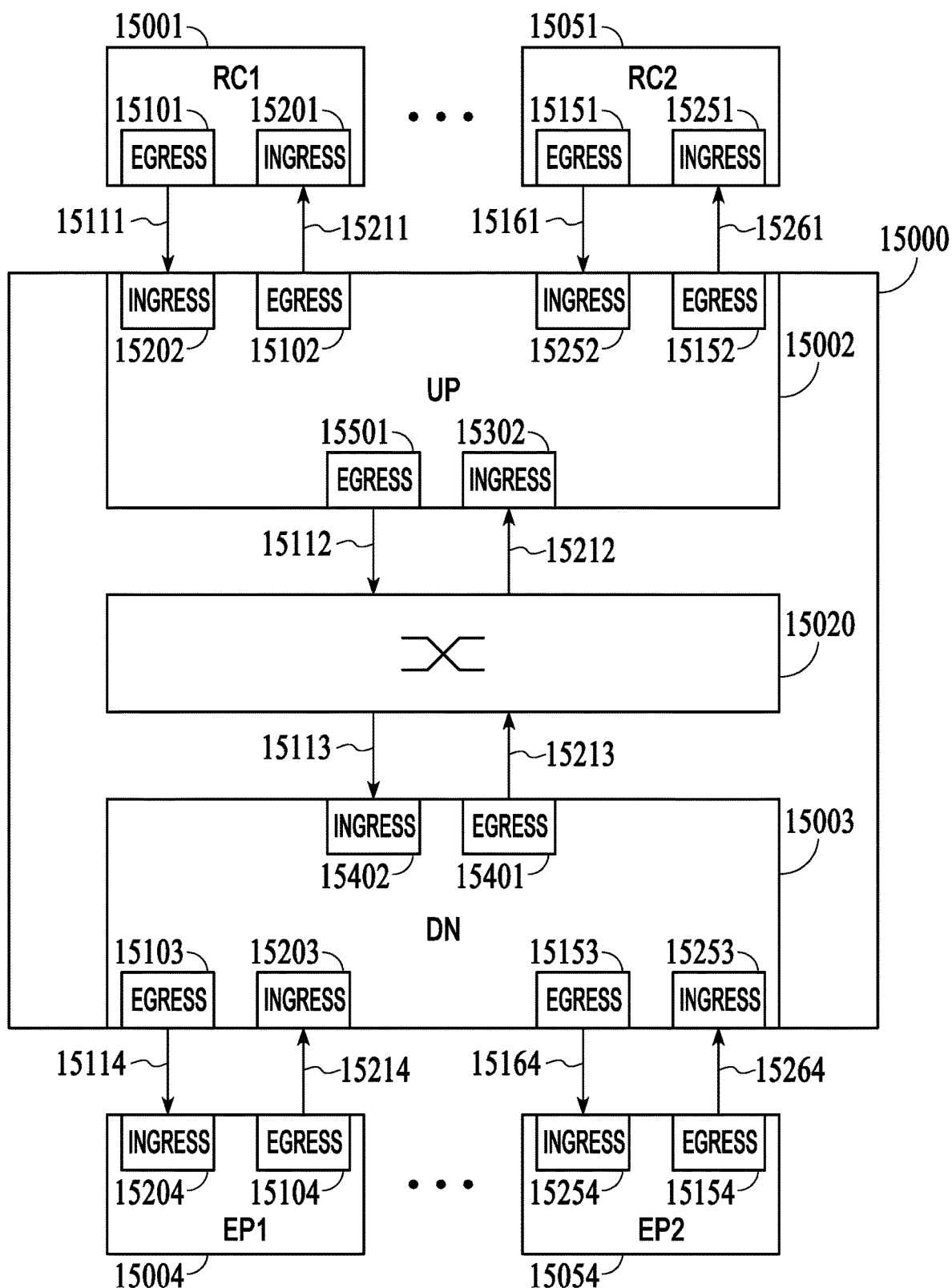
FIG. 15 describes a distributed switch which tunnels multiple different protocols concurrently.

In another embodiment, this invention can, obviously, transport Packets of multiple different First Protocols over a Second Protocol, concurrently. This is described, for example, in FIG. 15 where the distributed multi-protocol switch 15000 can transport Packets of one First Protocol, which can be PCIe, for example, along with Packets of another First Protocol which can be MIPI-CSI-2, for example, by encapsulating those Packets of each First Protocol into Packets of a Second Protocol, which can be TCP/IP, for example. In this case, the Egress Port 15101 of RC1 15001 sends Packets of one particular First Protocol via connection 15111 to the Ingress Port 15202 of UP 15002 and Egress Port 15103 of DN 15003 then sends Packets of that same particular First Protocol via connection 15114 to the Ingress Port 15204 of EP1 15004, and Egress Port 15104 of EP1 15004 further sends Packets of that same particular First Protocol via connection 15214 to Ingress Port 15203 of DN 15003 and Egress Port 15102 then sends Packets of that same particular First Protocol via connection 15211 to Ingress Port 15201 of RC1 15001. Concurrently, Egress Port 15151 of RC2 15051 sends Packets of another First Protocol via connection 15161 to Ingress Port 15252 of UP 15002 and Egress Port 15153 of DN 15003 sends Packets of that other First Protocol via connection 15164 to Ingress Port 15254 of EP2 15054, and Egress Port 15154 of EP2 15054 sends Packets of that other First Protocol via connection 15264 to Ingress Port 15253 of DN 15003 and Egress Port 15152 of UP 15002 then sends those Packets of that other First Protocol via connection 15261 to Ingress Port 15251 of RC2 15051. Within the distributed multi-protocol switch 15000 UP 15002 receives and encapsulates the Packets of the two, or more, First Protocols into Packets of the Second Protocol and Egress Port 15501 of UP 15002 then sends those packets of the Second Protocol via connection 15112 and connection 15113 to Ingress Port 15402 of DN 15003, and within DN 15003 all Packets of the two, or more, First Protocols get decapsulated from the Packets of the Second Protocol and, based on their type and destination, get handed over to either Egress Port 15153 or Egress Port 15103. And, DN 15003 receives and encapsulates the Packets of the two, or more, First Protocols into Packets of the Second Protocol and Egress Port 15401 of DN 15003 then sends those packets of the Second Protocol via connection 15213 and connection 15212 to Ingress Port 15302 of UP 15002, and within UP 15002 all Packets of the two, or more, First Protocols get decapsulated from the Packets of the Second Protocol and, based on their type and destination, get handed over to either Egress Port 15102 or Egress Port 15152.

Optionally, within the distributed multi-protocol switch 15000 the Packets of the Second Protocol can be transported via the Multi-Connect 15020 which, for example, can be an On chip Network such as AXI or a hardware/software Crossbar or a Layer-2 Ethernet network switch. Furthermore, both, UP 15002 and DN 15003 can implement different scheduling and/or traffic shaping and/or frame preemption and/or aggregation in order to give the Packets of the First Protocol associated with RC1 15001 and EP1 15004 higher or lower priority over the Packets of the other First Protocol associated with RC2 15051 and EP2 15054.

For example, the applications communicating via Packets of the First Protocol (such as PCIe, or CAN, or LIN, for example) associated with RC1 15001 and EP1 15004 may require tunneling immediately and without packet loss, while other applications communicating via Packets of the other First Protocol (such as MIPI CSI-2, SDI, for example) associated with RC2 15051 and EP2 15054 may be more tolerant to deadlines and/or even to packet loss. The transport of Packets of the Second Protocol then can be lossless, or lossy, for example using UDP or TCP. Obviously the concepts described above can be combined, for example, one can combine the concept of FIG. 15 to tunnel multiple different First Protocols with the concept of FIG. 5 to tunnel the Second Protocol over a Third Protocol, and to implement either best-effort or even real-time behaviour, for example using TCP/IP over TSN. In those cases such a multi-protocol heterogeneous packet-based transport must deal with issues such as deadlocks and/or starvation individually and separately, as it has been described above, for example in FIG. 12.

In yet another embodiment, this invention is a distributed, disaggregated storage system using Flash Memory or Storage Class Memory or NVMe Solid-State Drives (SSD). In such an embodiment, according to FIG. 5 EP 5006 can be one, or more, SSDs physically connected to DN-DN 5005 via connection 5011 which operates the NVMe protocol over PCIe as a First Protocol. The NVMe/PCIe protocol, or more precisely the PCIe TLP, can then be transported over TCP/IP which is the Second Protocol 5012, and that Second Protocol, TCP/IP, can further be transported over Ethernet a Third Protocol 5013. Obviously, any Ethernet can be used, however, given the bandwidth and latency requirements of modern storage systems, it is beneficial to use high-speed Ethernet such as 10 Gigabit Ethernet, or faster. Sometimes, a storage system may need to deliver certain latency aspects and in such a case, the Second Protocol can be DetNet, or the Third Protocol can also be TSN. Similarly, different topologies can be implemented, as it is described in FIG. 3 where multiple SSD (EP 3004 and EP 3006) can be connected via NVMe/PCIe connection 3011 to one single host, namely RC 3001. Or, in FIG. 4 where multiple SSD (EP4004 and EP 4006) can be connected via NVMe/PCIe connection 4011 to multiple PCIe RC 4001 and 4008. According to the PCIe Specification this can be dedicated point-to-point connections, for example the first host RC 4001 can only operate the first SSD EP 4004, and the second host RC 4008 can only operate the second SSD EP 4006, and so forth. Or, this can utilize so-called PCIe Multi-Root-Awareness where any host can operate with any SSD. It is obvious that such a distributed storage system can comprise multiple digital circuits each for the Upstream Port (UP), for the Downstream Port (DN) and for the Switch (SW) component, or that an implementation can comprise one or more instances of the UP (for example, UP 3002 or UP 4002 or UP 4009 or UP-UP 5002), of the switch (for example SW 3007 or SW 4007 or UP-DN 5003 or DN-UP 5004), of the DN (for example DN 3003 or DN 3005 or DN 4003 or DN 4005 or DN-DN 5005), into one single digital chip, for example one PLD.

Figure 16:
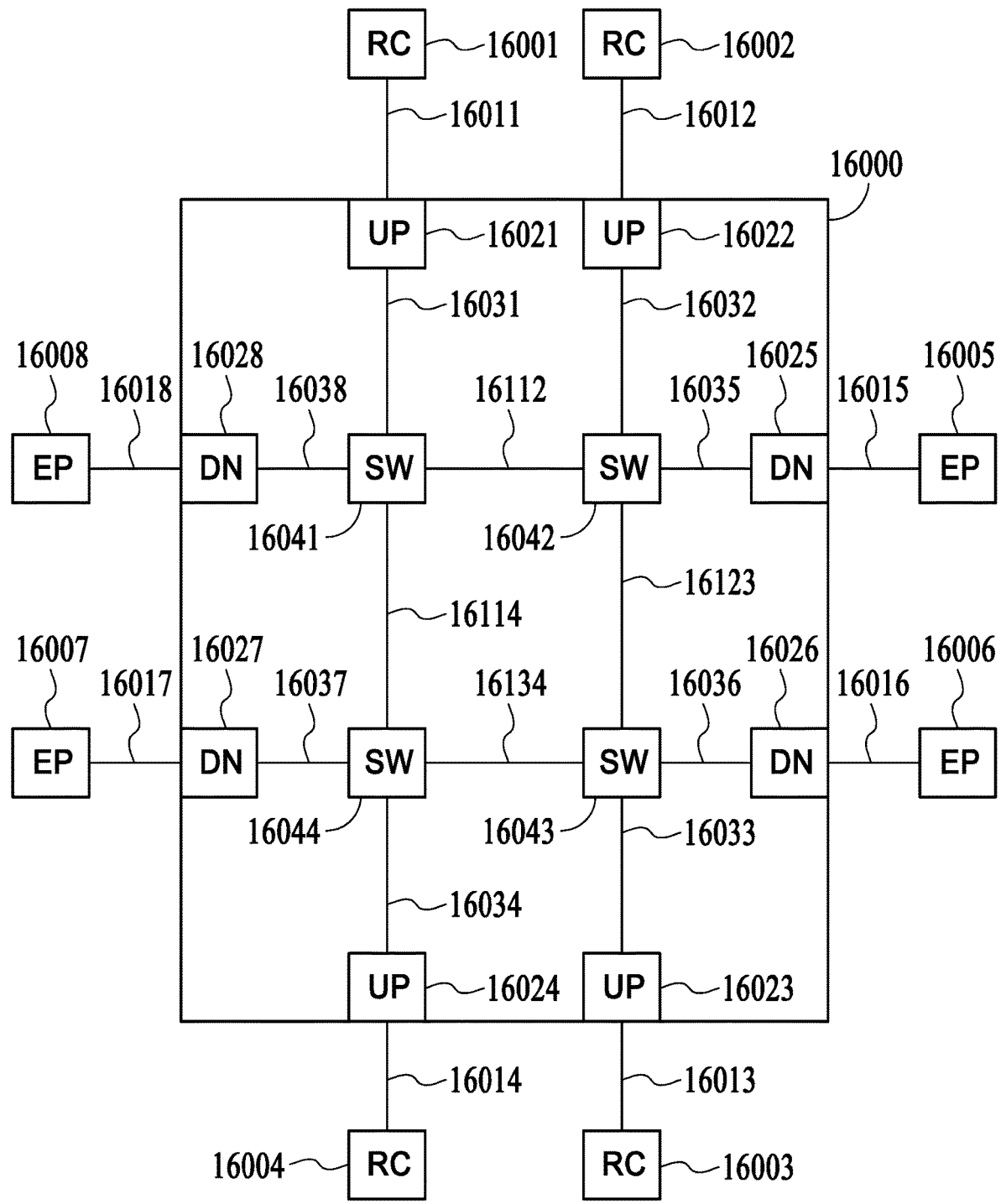
FIG. 16 describes a ring topology for a distributed switch.

Yet another embodiment of this invention is a distributed real-time networking system which uses a real-time transport for the underlying Third Protocol to transport Packets of a Second Protocol which by themselves transport Packets of multiple different First Protocols. In automotive or industrial networks this may, for example, transport PCIe, MIPI-CSI-2, CAN, LIN, BroadR-Reach as multiple First Protocols over TCP/IP as a Second Protocol over TSN as a Third Protocol to combine the benefits of lossless transport of TCP/IP with real-time behaviour of TSN to tunnel so-called short-range protocols to achieve longer ranges. Or, another benefit is to reduce the amount of different cables, each transporting one single First Protocol, by aggregating all those individual protocols and tunneling them over one single cable, which can be less weight or less cost. Another advantage of such real-time multi-protocol heterogeneous packet-based transport where TSN is used for the Second or for the Third Protocol is the possibility to also utilize certain functionality described in the IEEE Standards for TSN (such as Traffic Shaping, Scheduling, Preemption, Precision Timing) to transport protocols which do not have such features, like PCIe, for example. Or a precision time protocol such as IEEE 1588 or IEEE 802.1AS can be used to add timing behavior to protocols which originally do not have such features, like PCIe, for example. Or features like packet duplication and re-routing enhancing reliability, as it is described in IEEE 802.1CB, for example, can be used and provided for protocols which originally do not have such features, like PCIe, for example. However, even when using TSN or DetNet or DCTCP the key challenge still remains to avoid deadlocks at connection and at system-level by using the concepts described in FIG. 9 and FIG. 12, for example. Furthermore, the concept of real-time multi-protocol heterogeneous packet-based transport can be combined with different networking topologies, as supported by the underlying Second Protocol, or Third Protocol: A point-to-point topology connecting one RC with one EP, as it is described in FIG. 1, for example, can be applied. Or, more sophisticated topologies such as tree topologies, ring topologies, dual ring topologies or mesh topologies or 2D torus or 3D torus topologies can be applied as this can be used to further enhance the reliability of a system, as typically required in automotive, medical and industrial systems. This is described in FIG. 16, where multiple RC and EP are connected via multiple corresponding distributed switches SW with each other and form a ring topology. These distributed switches can also be referred to as nodes within a distributed switch network. Each RC, which is RC 16001 or RC 16002 or RC 16003 or RC 16004 has a corresponding connection, which is connection 16011, or connection 16012, or connection 16013, or connection 16014, respectively with a corresponding UP, which is UP 16021, or UP 16022, or UP 16023, or UP 16024, respectively, to send and/or receive Packets of a First Protocol. Furthermore, each EP, which is EP 16005 or EP 16006 or EP 16007 or EP 16008, has a corresponding connection, which is connection 16015, or connection 16016, or connection 16017, or connection 16018, respectively, with a corresponding DN, which is DN 16025, or DN 16026, or DN 16027, or DN 16028, respectively, to receive and/or to send Packets of a First Protocol. Each UP, which is UP 16021, or UP 16022, or UP 16023, or UP 16024, then has a corresponding connection, which is connection 16031, or connection 16032, or connection 16033, or connection 16034, respectively, with a corresponding switch, which is SW 16041, or SW 16042, or SW 16043, or SW 16044, respectively to send and/or receive Packets of a Second Protocol. Furthermore, each DN, which is DN 16025, or DN 16026, or DN 16027, or DN 16028 also has a corresponding connection, which is connection 16035, or connection 16036, or connection 16037, or connection 16038, respectively, with a corresponding switch, which is SW 16041, or SW 16042, or SW 16043, or SW 16044, respectively to send and/or receive Packets of a Second Protocol. Each switch, which is SW 16041, or SW 16042, or SW 16043, or SW 16044, also has a connection, which is connection 16112, or connection 16123, or connection 16134, or connection 16114, respectively, to send and/or receive Packets of the Second Protocol to and/or from two other switches. This effectively forms the distributed switch 16000 with a single ring topology. Such ring topologies can increase the reliability, as it may be required to fulfill certain Functional Safety aspects: In case one connection drops due to a failure the Packets can be rerouted using the remaining connections. For example, if connection 16112 fails, the Packets sent between switch SW 16041 and switch SW 16042 can get rerouted via connection 16114, connection 16134 and connection 16123.

Figure 17A:
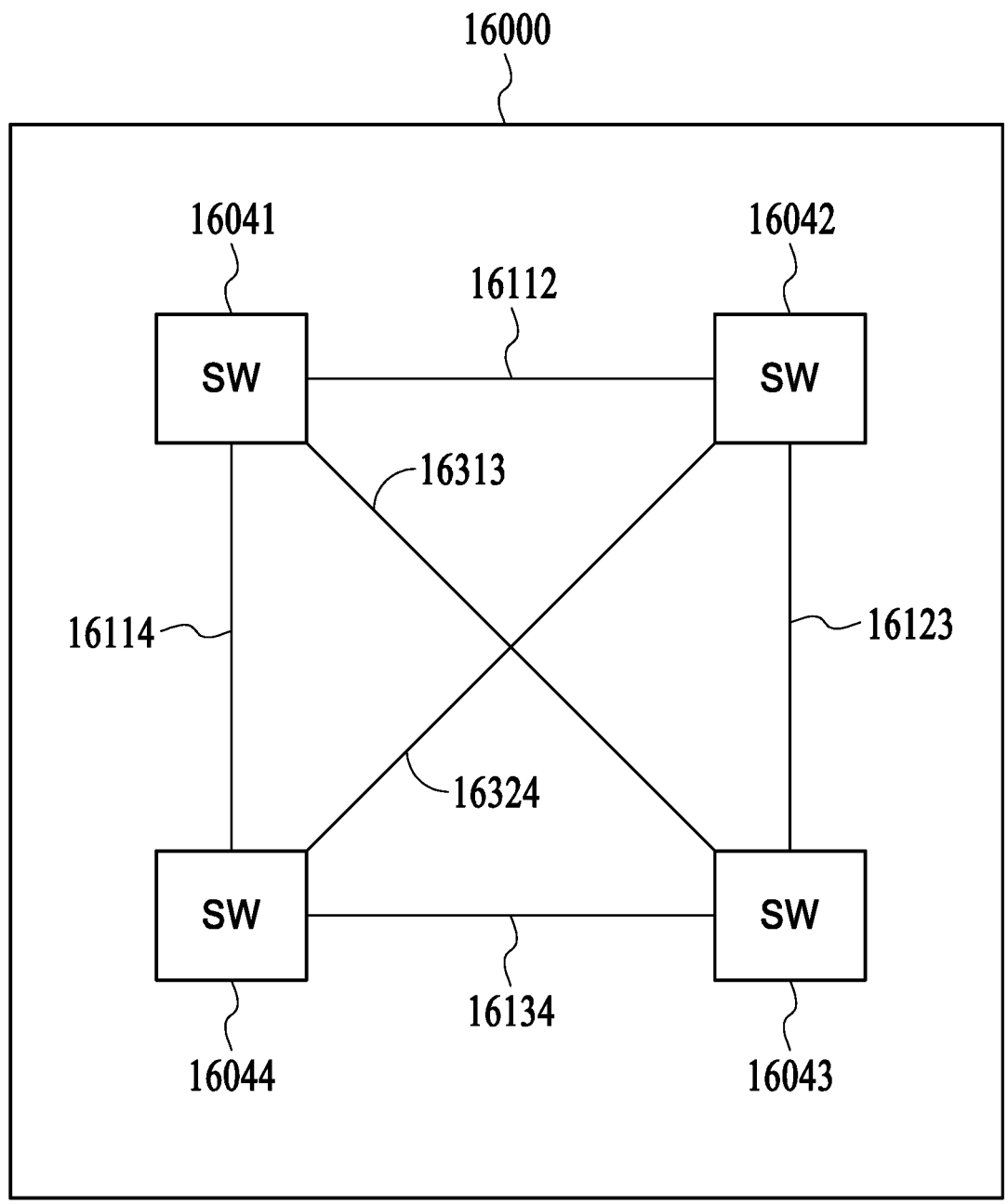
FIG. 17A describes a dual ring topology for a distributed switch.
Figure 17B:
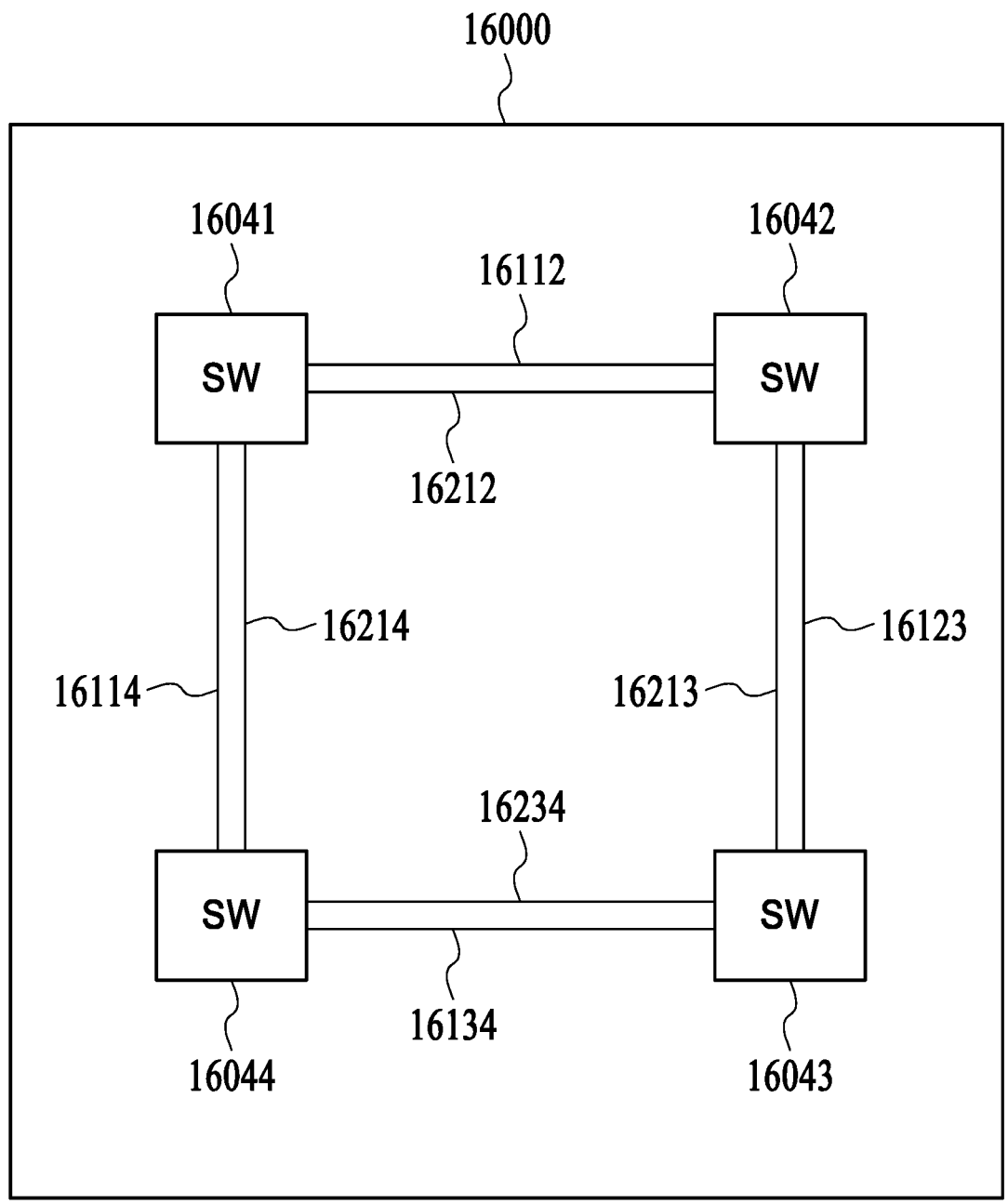
FIG. 17B describes a mesh topology for a distributed switch.

Obviously, the distributed switch 16000 can also form a dual ring topology by adding connections, which is connection 16212, connection 16213, connection 16234, connection 16214, respectively, between each switch, which is SW 16041, or SW 16042, or SW 16043, or SW 16044, as it is shown in FIG. 17A. And, obviously, the distributed switch 16000 can also form a mesh topology by adding connections, which is connection 16313, connection 16324, respectively, between each switch, which is SW 16041, or SW 16042, or SW 16043, or SW 16044, as it is shown in FIG. 17B. While ring topologies or mesh topologies add reliability by adding redundant connections, and therefore can operate in a fail-safe or fail-over mode in case one, or more, connections fail, they also add to the complexity, including the need to determine different routes between the switches. To further increase reliability or system availability above concepts can be combined with concepts that involve duplicating packets, as it is used in multicast or broadcast, or in so-called multi-path routing or by using Ethernet Parallel Redundancy Protocol (PRP) or High-Availability Seamless Redundancy (HSR), or other concepts described, for example, in IEEE 802.1CB or in IEC62439-3.

In yet another embodiment, this invention can be used to implement time synchronization between two, or more, Time Domains within a heterogenous packet-based transport system, where time information, which can be, for example, clock, phase and/or time-of-day (TOD), is synchronized via so-called Time Packets. The Time Packets can, for example, be PCIe Precision Time Measurement (PTM) packets or IEEE 1588 (PTPv2) based packets or IEEE 802.1AS packets. Obviously, this includes PCIe PTM packets encapsulated into Packets of a First Protocol which can be, for example, TSN. A Time Domain is a subsystem of components connected via the same protocol where one, or more, the components use one, or more, local clocks each as a local representation of time and where the one, or more, local clocks can get synchronized via Time Packets of the protocol.

Figure 18:
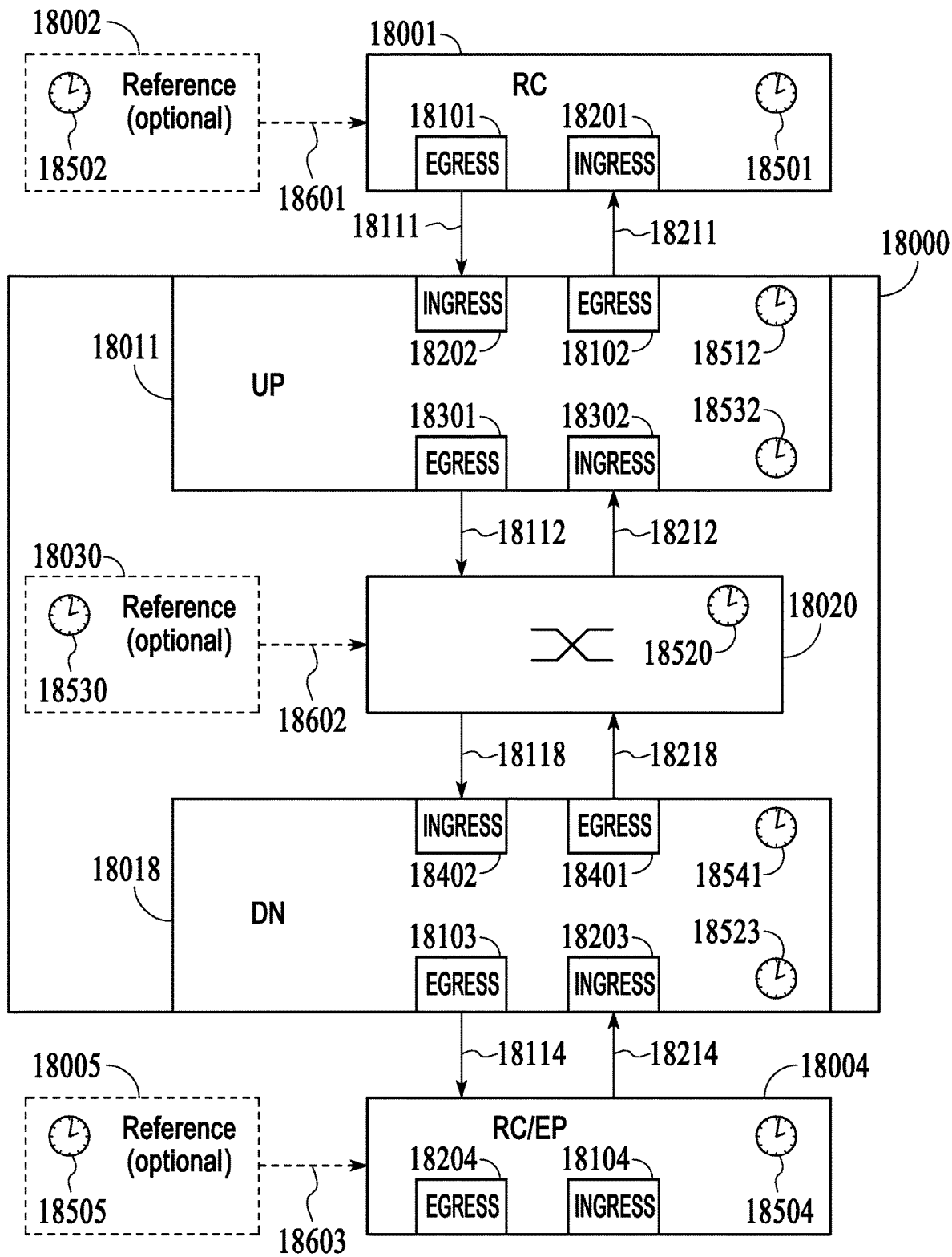
FIG. 18 describes time synchronization in a heterogeneous packet-based transport system.

Unfortunately, precise time synchronization within a heterogeneous packet-based transport system is not trivial if one and the same Time Domain using a First Protocol is connected via a Second Protocol (or, similarly, via a Third or Fourth Protocol). This is shown in FIG. 18 where a first RC, RC 18001, is connected to a second RC (or EP), RC/EP 18004, via the distributed switch 18000 where RC 18001 is connected to the distributed switch 18000 via connections 18111 and connection 18211 transporting Packets of a First Protocol, and where RC/EP 18004 is connected to distributed switch 18000 via connection 18114 and connection 18214 which also transport Packets of the First Protocol. Thereby, the distributed switch 18000 effectively connects RC 18001 and RC/EP 18004 to form one single (but distributed) First Time Domain within the First Protocol which can be used for time synchronization between RC 18001 and RC/EP 18004, for example synchronizing the local clock 18501 of RC 18001 with the local clock 18504 of RC/EP 18004, or, for example, to synchronize both local clocks 18501 and 18504 with a so-called Grandmaster Clock which can be an external reference clock, for example, Reference Clock 18502 of a reference system 18002 connected to RC 18001 via connection 18601, or Reference Clock 18505 of a reference system 18005 connected to RC/EP 18004 via connection 18603.

Distributed switch 18000 internally transports Packets of a First Protocol over Packets of a Second Protocol and, thereby, is in a different Second Time Domain. The challenge now arises from the fact that for proper time synchronization of all components in the First Time Domain (here, RC 18001 and RC/EP 18004) the transport delays (or transport latencies, or transport duration) of the Packets of the Second Protocol within the distributed switch 18000 are unknown and not trivial to obtain from the perspective of the First Time Domain. Therefore, the straight-forward solution of simply encapsulating the Time Packets of the First Protocol into Packets of the Second Protocol for time synchronization between RC 18001 and RC/EP 18004 may not provide sufficient time precision. Hence, a more precise time synchronization for a real-time multi-protocol heterogeneous packet-based transport system is needed.

Yet another embodiment of this invention is the real-time multi-protocol heterogeneous packet-based transport system according to FIG. 18.

Here, the Egress Port 18101 of RC 18001 can send Time Packets as Packets of a First Protocol via the connection 18111 to the Ingress Port 18202 of UP 18011, and the Ingress Port 18201 of RC 18001 can receive Time Packets as Packets of the First Protocol via connection 18211 from the Egress Port 18102 of UP 18011. Similarly, the Ingress Port 18204 of RC/EP 18004 can receive Time Packets as Packets of the First Protocol via connection 18114 from the Egress Port 18103 of DN 18018 and the Egress Port 18104 can send Time Packets as Packets of the First Protocol via connection 18214 to the Ingress Port 18203 of DN 18018. Within the distributed switch 18000, the Egress Port 18301 of UP 18011 can further send Time Packets as Packets of the Second Protocol via the connection 18112 and connection 18118 (via Multi-Connect 18020) to the Ingress Port 18402 of DN 18018. Within the distributed switch 18000 the Ingress Port 18302 of UP 18011 can receive Time Packets as Packets of the Second Protocol via connection 18212 coming from connection 18218 (via Multi-Connect 18020) of the Egress Port 18401 of DN 18018.

The—optional—Multi-Connect 18020 within the distributed switch 18000 can transport Packets of the Second Protocol and, for example, can be an On chip Network such as AXI or a hardware crossbar or a software crossbar or a network switch with timing capabilities, for example TSN capabilities.

For precision time synchronization between multiple Time Domains, each component, RC 18001, UP 18011, Multi-Connect 18020, DN 18018, RC/EP 18004, can have local representations of the global time using one, or more, local clocks. For example, RC 18001 can include local clock 18501, or UP 18011 can include local clock 18512 and/or local clock 18532, or Multi-Connect 18020 can include local clock 18520, or DN 18018 can include local clock 18541 and/or local clock 18523, or RC/EP 18004 can include local clock 18504. In addition to these system-internal clocks optional reference clocks as described above can be a Grandmaster Clock and can be synchronized with via a time synchronization protocol, for example via PCIe PTM, via PTPv2, via pulse per second (PPS) plus a reference clock plus TOD using, for example, interfaces such as UART, SPI, I2C, RIG, etc., or via various versions of the RIG protocol group, or GPS time signals, or via other time synchronization protocols. Reference clocks can, for example, be reference clock 18502 connected to RC 18001 in the First Time Domain, reference clock 18505 connected to RC/EP 18004, also in the First Time Domain, or reference clock 18030 with local time 18530 connected via 18602 to Multi-Connect 18020 located in a second Time Domain.

For precise time synchronization a distributed switch of a heterogeneous packet-based transport system, for example distributed switch 18000, can detect the transport delays from an upstream switch port, for example UP 18011 to a downstream switch port, for example, DN 18018, or vice versa, using various concepts known in the art: For example, UP 18011 can read a start time from local clock 18532 and, at the same time, can send a Time Packet to DN 18018. Upon receipt, DN 18018 reads its own local clock 18541 and, at the same time, can respond by sending a Time Packet back to UP 18011. Upon receipt, UP 18011 can read a stop time from local clock 18532 and, at the same time, can send another Time Packet back to DN 18018. Finally, upon receipt of that Time Packet DN 18018 can read a stop time from local clock 18541. The outcome is that, UP 18011 and DN 18018 each can now compute a round-trip time by each subtracting their start time from their stop time. The transport delay can then be precisely estimated as one half of the round-trip time. Obviously, this symmetric approach can be made even more precise by using multiple rounds, or by other means known in the art. With the transport delays known within the distributed switch a precise time synchronization can then be performed between components of the First Time Domain.

Or, time can be synchronized within a single network or across multiple networks with a synchronization mechanism in place at the networks' boundaries, for example, as it is shown by the reference clock 18002 where local time information of its local clock 18502 is facilitated by RC 18001 to adjust its local clock 18501 as it is communicated via a timing protocol 18601. The time information of clock 18501 may then be used to further synchronize the time information via the First Protocol, which can, for example, be PCIe, to UP 18011 and its local clock 18512. Because RC 18001 can also receive time information via the First Protocol from UP 18011 an algorithm based on clock stability estimation and each clocks distance to an atomic clock in protocol hops. Stratum 1, for example, an atomic clock based time source, or GNSS synchronized clock, or radio clock, and/or Stratum 2, a time server connected to one or more atomic clocks, and/or Stratum 3, connected to one or more Stratum 2 servers and so on. One example of such an algorithm is the best master clock (BMC) algorithm of PTPv2. To provide highest precision within time distribution networks, packet transport delays are communicated along with the timestamp information contained within the time synchronization protocols packets. This requires the components within a heterogeneous packet-based transport system to provide such time information on a packet by packet (or for less precision, on average or typical) granularity, which also requires the components to actively participate in the time distribution network and each to control a local clock. A distributed switch, for example distributed switch 18000, can maintain multiple time domains and can keep those synchronized as it interfaces with multiple protocols, such as a First Protocol, a Second Protocol, etc, at the same time. A distributed switch can also distribute separate clock information and can span multiple physical devices, which, respectively, can maintain their own clock information. According to one embodiment of this invention, distributed switch can, for example, keep its internal clocks synchronized via the Second Protocol, which can, for example, be TSN/PTPv2. A distributed switch can further use this time information to provide transition durations to Time Packets of the First Protocol, which can, for example, be PCIe PTM, the Time Packets of the First Protocol passing through the distributed switch. For example, RC/EP 18004 can send PCIe PTM Time Packets to RC 18001 via distributed switch 18000. Furthermore, distributed switch 18000 can act as a clock master to synchronize with components from two, or more, Time Domains, with the option of using external reference clock information instead of a local clock.

In yet one other embodiment this invention is a heterogeneous automotive network of so-called zonal gateways where multiple computers or CPUs or GPUs or FPGAs or SoCs are connected to a zonal gateway via a First Protocol, which can, for example, be PCIe or MIPI CSI-2 or CAN or LIN or SATA or NVMe or SDI or GMSL or FPD-III or IIC or Bluetooth, and where the zonal gateways are connected with each other via a Second Protocol, which can, for example, be TCP/IP or Ethernet or TSN, and where Packets of the First Protocol are transported via Packets of the Second Protocol and where Time Packets of the First Protocol and/or Time Packets of the Second Protocol can be used for precision time synchronization to deliver real-time behavior.

Obviously, for all the above embodiments relating to real-time applications or precision time synchronization, our solution on how to avoid deadlocks also applies to Time Packets and encapsulation of Time Packets.

What is claimed is:

1. A method to bound propagation latency in a heterogeneous packet-based transport system, the method comprising:
   receiving a first plurality of packets from a root complex, contents of each packet from the first plurality of packets organized in accordance with a first protocol, the first protocol including specification of one or more packet types;
   adding a sequence number to each packet in the first plurality of packets, the sequence number added to each packet in the first plurality of packets being different from the sequence number for every other packet in the first plurality of packets;
   identifying a packet type for each packet in the first plurality of packets, wherein there are at least two different packet types;
   encapsulating every packet in the first plurality of packets into at least one packet organized in accordance with a second protocol to form a second plurality of packets organized in accordance with the second protocol;
   sending all the packets from the second plurality of packets via a plurality of connections so that each connection from the plurality of connections only transports packets from the second plurality of packets that encapsulate packets from the first plurality that have a same packet type;
   for each connection in the plurality of connections, performing the following:
      sending the packets from the second plurality of packets in a particular predetermined traffic shape;
      receiving packets from the second plurality of packets organized in accordance with the second protocol;
      disassembling the packets from the second plurality of packets to recover packets from the first plurality of packets with a same packet type, including a sequence number for each packet from the first plurality of packets organized in accordance with the first protocol;
      ordering the packets from the first plurality of packets in accordance with the first protocol such that each packet from the first plurality of packets is in order relative to the sequence number added to the packet;
      deciding based on a flow control counter for each packet type whether to send to an endpoint each packet in the first plurality of packets organized in accordance with the first protocol, or whether to wait.

2. A method as in claim 1, wherein the first protocol is one of the following:
   PCI Express;
   NVM Express;
   MIPI CSI-2;
   GMSL;
   FPD-III;
   SDI;
   Ethernet;
   EtherCat;
   ProfiNet;
   Sercos;
   BroadR-Reach;
   Bluetooth;
   SATA;
   SAS;
   USB;
   CAN;
   LIN.

3. A method as in claim 1, wherein the second protocol is one of the following:
   TCP/IP;
   UDP/IP;
   IP;
   IPSec;
   DCTCP;
   QUIC;
   TSN;
   BroadR-Reach;
   WiFi;
   Ethernet.

4. A method as in claim 1, wherein the at least one packet organized in accordance with the second protocol is a single packet and wherein at least two packets from the first plurality of packets, including sequence numbers, are aggregated into the single packet organized in accordance with the second protocol.

5. A method as in claim 1, wherein at least one connection in the plurality of connections does not exceed a predetermined data rate.

6. A method as in claim 1, wherein at least one connection in the plurality of connections has a predetermined duration during which data can be transmitted.

7. A method as in claim 1, wherein at least one connection in the plurality of connections has priority over the other connections in the plurality of connections.

8. A method as in claim 1, wherein at least one connection in the plurality of connections has a predetermined transmission bandwidth reserved at any given time.

9. A method as in claim 1, wherein at least one connection in the plurality of connections has a predetermined timeslot scheduled during which data can be transmitted.

10. A heterogeneous packet-based transport system, comprising:
    a distributed switch that receives a plurality of packets from a root complex, contents of each packet from the plurality of packets organized in accordance with a first protocol, the first protocol including specification of one or more packet types, the distributed switch including:

a first port that includes a plurality of transmit buffers, the first port performing the following:
adds a sequence number to each packet in the plurality of packets, the sequence number added to each packet in the plurality of packets being different from the sequence number for every other packet in the plurality of packets,
identifies a packet type for each packet in the plurality of packets,
inserts all the packets from the plurality of packets along with added sequence numbers into a plurality of transmit buffers so that each transmit buffer from the plurality of transmit buffers only holds packets of one packet type,
wherein for each transmit buffer in the plurality of transmit buffers, each packet inserted into the transmit buffer is encapsulated, including a sequence number for the packet, into at least one packet organized in accordance with a second protocol;
and wherein for each transmit buffer in the plurality of transmit buffers data is transmitted in particular predetermined traffic shape;
a second port that includes a plurality of receiver buffers, a receiver buffer from the plurality of receiver buffers receiving the at least one packet organized in accordance with the second protocol as sent from the transmit buffer, the receive buffer receiving packets of only one packet type, the receive buffer receiving packets of a same packet type that is held by the transmit buffer, wherein the second port receives the at least one packet within a predetermined maximum latency and then disassembles the at least one packet organized in accordance with the second protocol to recover the packet inserted into the transmit buffer, including a sequence number for the packet, the second port ordering all the packets from the first plurality of packets such that each packet from the plurality of packets is in order relative to the sequence number added to the packet and the second port decides based on a flow control counter for each packet type whether to send each packet in the plurality of packets to an endpoint, or whether to wait.

11. A heterogeneous packet-based transport system as in claim 10, wherein the first protocol is one of the following:
PCI Express;
NVM Express;
MIPI CSI-2;
GMSL;
FPD-III;
SDI;
Ethernet;
EtherCat;
ProfiNet;
Sercos;
BroadR-Reach;
Bluetooth;
SATA;
SAS;
USB;
CAN;
LIN.

12. A heterogeneous packet-based transport system as in claim 10, wherein the second protocol is one of the following:
TCP/IP;
UDP/IP;
IP;
IPSec;
DCTCP;
QUIC;
TSN;
BroadR-Reach;
WiFi;
Ethernet.

13. A heterogeneous packet-based transport system as in claim 10, implemented in a plurality of digital circuits, wherein portions of the digital circuits are implemented in at least one of the following:
VHDL;
Verilog HDL;
SystemC;
FPGA;
ASIC.

14. A heterogeneous packet-based transport system as in claim 10, wherein at least one connection in the plurality of connections does not exceed a predetermined data rate.

15. A heterogeneous packet-based transport system as in claim 10, wherein at least one connection in the plurality of connections has a predetermined duration during which data can be transmitted.

16. A heterogeneous packet-based transport system as in claim 10, wherein at least one connection in the plurality of connections has priority over the other connections in the plurality of connections.

17. A heterogeneous packet-based transport system as in claim 10, wherein at least one connection in the plurality of connections has a predetermined transmission bandwidth reserved at any given time.

18. A heterogeneous packet-based transport system as in claim 10, wherein at least one connection in the plurality of connections has a predetermined timeslot scheduled during which data can be transmitted.

* * * * *